Sept. 25, 1945.    C. T. BREWER    2,385,604
MACHINE FOR PRODUCING CONTAINERS AND PARTS THEREOF
Filed June 2, 1938    14 Sheets-Sheet 1

INVENTOR
CLARENCE T. BREWER
BY *[signature]*
ATTORNEY

Sept. 25, 1945.     C. T. BREWER     2,385,604
MACHINE FOR PRODUCING CONTAINERS AND PARTS THEREOF
Filed June 2, 1938     14 Sheets—Sheet 4

INVENTOR
*CLARENCE T. BREWER*
BY
ATTORNEY

Sept. 25, 1945. C. T. BREWER 2,385,604
MACHINE FOR PRODUCING CONTAINERS AND PARTS THEREOF
Filed June 2, 1938 14 Sheets-Sheet 5

INVENTOR
CLARENCE T. BREWER
BY
ATTORNEY

Sept. 25, 1945.   C. T. BREWER   2,385,604
MACHINE FOR PRODUCING CONTAINERS AND PARTS THEREOF
Filed June 2, 1938    14 Sheets-Sheet 6

INVENTOR
CLARENCE T. BREWER
BY
ATTORNEY

INVENTOR
CLARENCE T. BREWER
BY
ATTORNEY

Sept. 25, 1945. C. T. BREWER 2,385,604
MACHINE FOR PRODUCING CONTAINERS AND PARTS THEREOF
Filed June 2, 1938 14 Sheets-Sheet 8
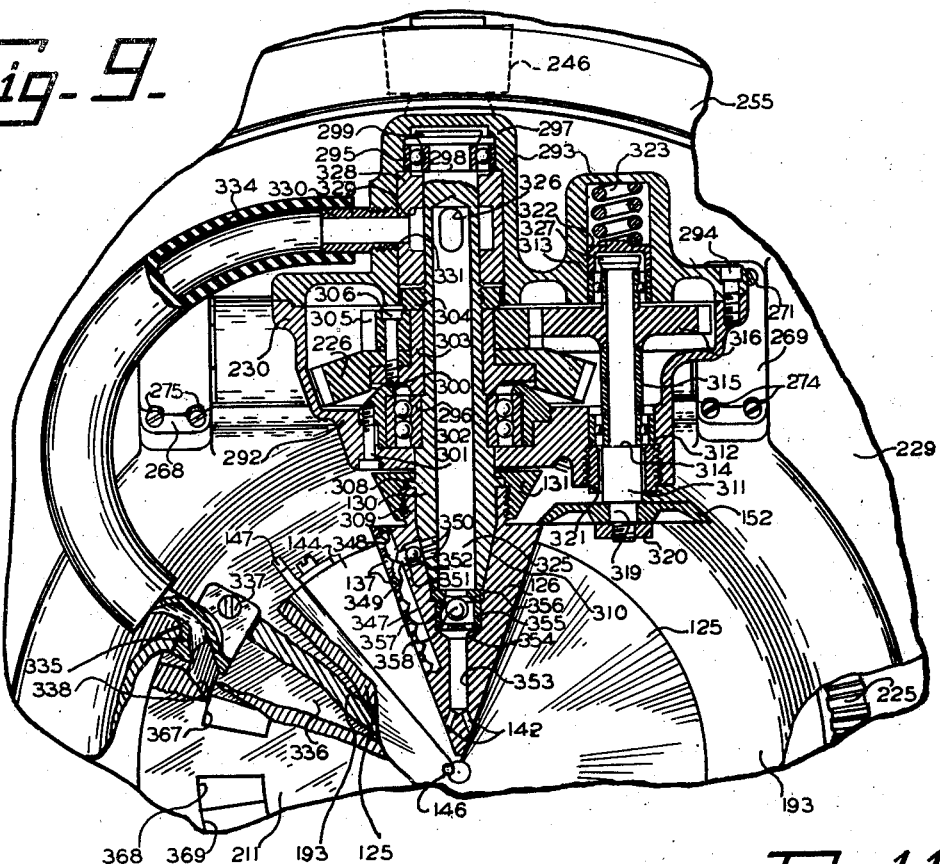
Fig-9-
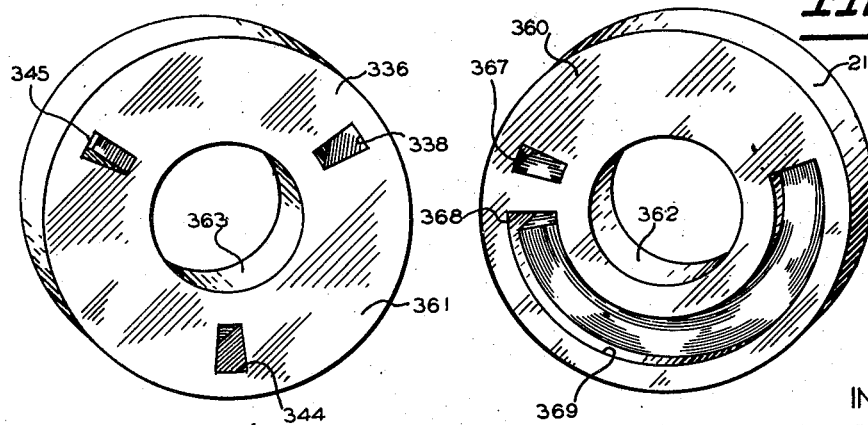
Fig-10- Fig-11-
INVENTOR
CLARENCE T. BREWER
BY
ATTORNEY Sept. 25, 1945.   C. T. BREWER   2,385,604
MACHINE FOR PRODUCING CONTAINERS AND PARTS THEREOF
Filed June 2, 1938   14 Sheets-Sheet 9

INVENTOR
CLARENCE T. BREWER
BY
ATTORNEY

Sept. 25, 1945.  C. T. BREWER  2,385,604
MACHINE FOR PRODUCING CONTAINERS AND PARTS THEREOF
Filed June 2, 1938  14 Sheets-Sheet 10

INVENTOR
CLARENCE T. BREWER
BY *[signature]*
ATTORNEY

Sept. 25, 1945.  C. T. BREWER  2,385,604
MACHINE FOR PRODUCING CONTAINERS AND PARTS THEREOF
Filed June 2, 1938  14 Sheets-Sheet 12

INVENTOR
CLARENCE T. BREWER
BY
ATTORNEY

Sept. 25, 1945. C. T. BREWER 2,385,604
MACHINE FOR PRODUCING CONTAINERS AND PARTS THEREOF
Filed June 2, 1938 14 Sheets-Sheet 13
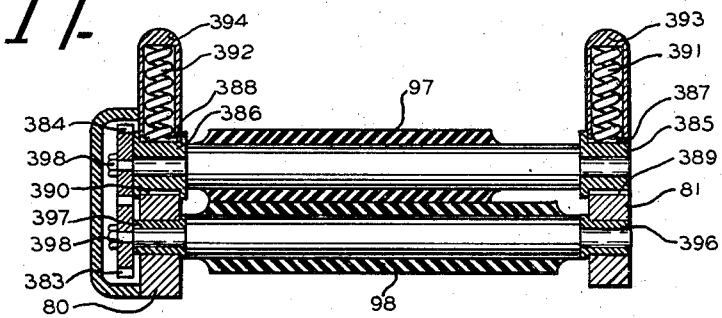
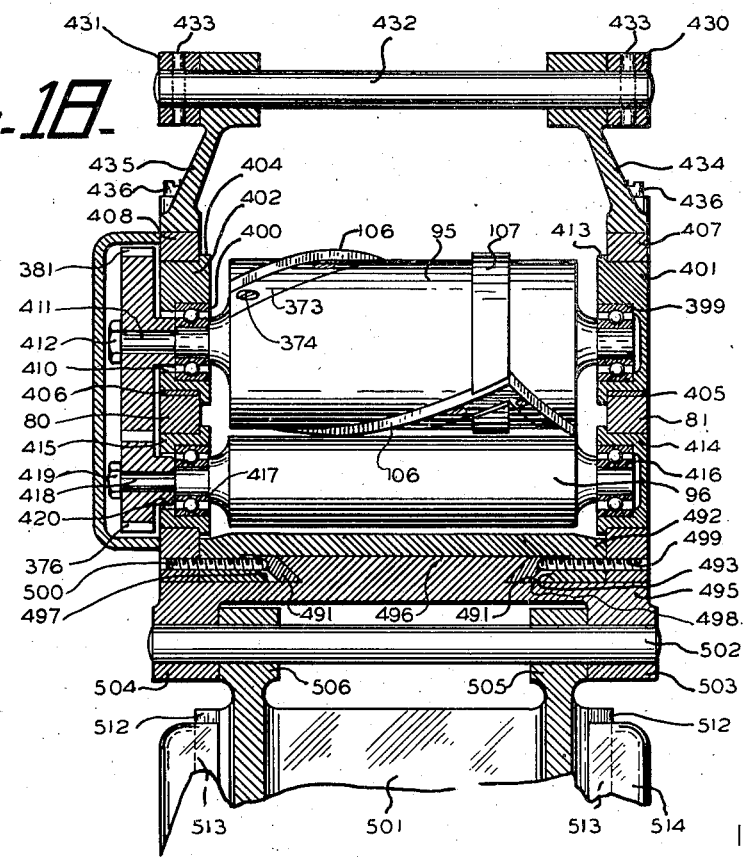
INVENTOR
CLARENCE T. BREWER
BY
ATTORNEY Sept. 25, 1945.   C. T. BREWER   2,385,604
MACHINE FOR PRODUCING CONTAINERS AND PARTS THEREOF
Filed June 2, 1938   14 Sheets-Sheet 14
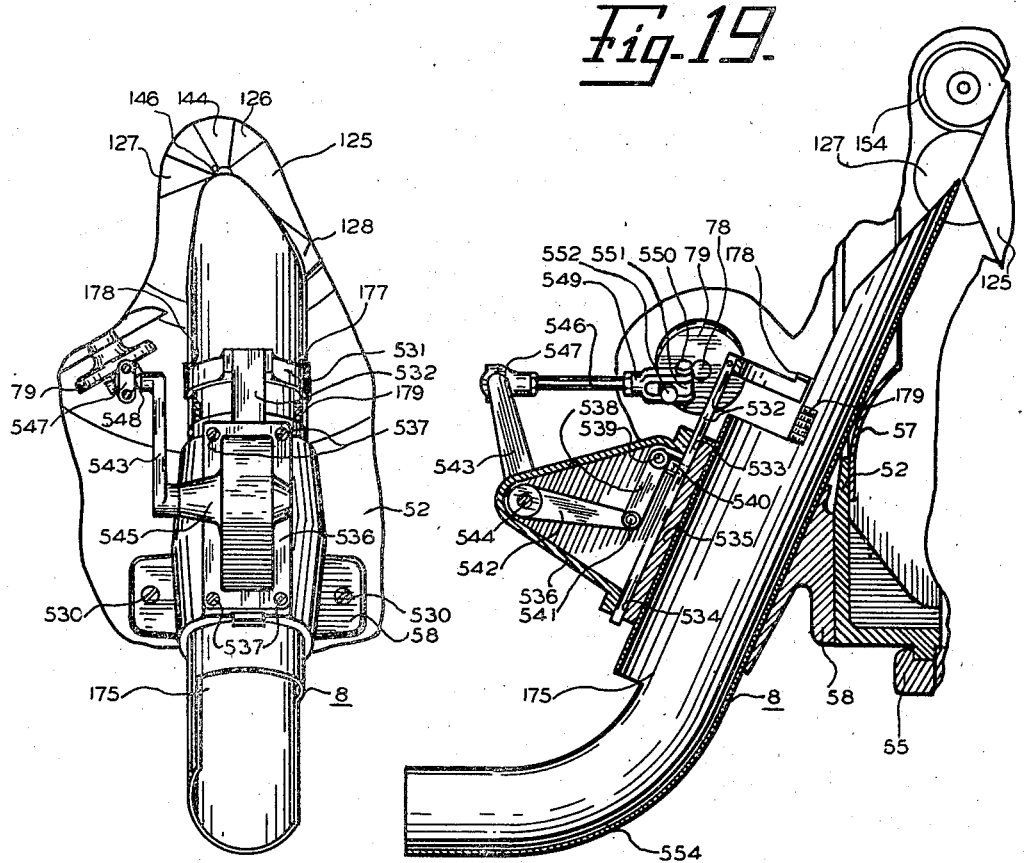
INVENTOR
CLARENCE T. BREWER
BY
ATTORNEY Patented Sept. 25, 1945

2,385,604

UNITED STATES PATENT OFFICE 2,385,604

MACHINE FOR PRODUCING CONTAINERS AND PARTS THEREOF

Clarence T. Brewer, Chicago, Ill., assignor to Dixie Cup Company, a corporation of Delaware Application June 2, 1938, Serial No. 211,387

46 Claims. (Cl. 93—36.2)

This invention relates to a machine for automatically producing containers or parts thereof from sheet stock, such as paper or other similar workable material, and more particularly to such a machine of improved design and construction which reduces the necessity of handling material or stock and efficiently operates at high speed.

In machines of the type disclosed herein, it is important mechanically and otherwise to minimize the number of reciprocating and intermittently operating parts, as well as to reduce the necessity of manually handling the stock or finished containers. From the mechanical standpoint, both time and energy are wasted in the stopping or slowing down and restarting of any intermittently operating parts of the machine itself or the stock carried thereby. The stopping or slowing down and restarting of intermittently operating parts also increases wear on, and more highly stresses, those and other parts of the machine at high speed. Manual handling or movement of stock or parts is undesirable from the standpoints of sanitation, cleanliness and efficiency.

In describing and defining the machine disclosed herein and the operation thereof in the specification and claims which follow, it will be understood that the term "cement" covers not only gluing, pasteing or using an adhesive, but also includes welding as accomplished with materials bonded by the application of heat, and mechanically bonding, as by crimping, unless the particular type of cementing is defined or denoted. Furthermore, it is understood that the term "containers" is not only applicable to cone cups, but is also applicable to parts of containers, such as tapered side walls for containers which may well be made on a machine embodying the principles disclosed and defined herein.

It is an object of this invention to provide a machine through which sheet stock, preferably such as that from a roll of predetermined width, is passed with continuous and substantially uniform motion to cut blanks of predetermined shape from the stock, form the blanks into containers and cement the said containers as formed.

Another object of this invention is to provide a machine for making paper containers, in which machine practically all of the parts operate with continuous and substantially uniform motion to thereby minimize the number of reciprocating and intermittently operated parts.

Another object of this invention is to provide a machine for making containers from sheet stock, in which machine the stock progresses with a continuous and substantially uniform movement.

Another object of this invention is to provide a machine for producing conical containers, which machine includes forming instrumentalities so constructed and arranged that the containers produced thereby are of uniform high quality and free of flaws.

Another object of this invention is to provide a machine for making containers from sheet stock, which machine includes certain adjustable and interchangeable parts which make possible the changing of the size and shape of the blanks from which the containers are formed and the size and shape of the containers.

Another object of this invention is to provide a machine for making containers from sheet stock which includes a means for applying cement to a predetermined portion of the stock and means for phasing the portions to which the cement is applied with respect to the container blanks that are cut from the stock.

Another object of this invention is to provide a machine for completely producing conical containers from sheet stock at high speed, the moving parts of which machine are actuated by a single prime mover.

Another object of this invention is to provide a machine for producing containers at high speed, ejecting and stacking the containers with a minimum of handling of the stock and containers.

Another object of this invention is to provide a machine for producing containers from sheet stock which includes parts adjustable to compensate for variations and differences in stock thickness.

Another object of this invention is to provide a machine for making paper containers at high speed which includes a container forming mechanism comprehending a plurality of similar forming mandrels, and a feeding mechanism for successively feeding stock to the mandrels as the mandrels and stock continue in motion.

Another object of this invention is to provide a machine for producing containers which includes a forming mandrel upon which the containers are formed and a continually operating shear for trimming an edge of the containers as they are formed.

Another object of this invention is to provide a machine for producing containers that are clean and sanitary.

Further objects and advantages of the invention will be apparent from the following description, reference being had to the accompanying drawings, wherein a preferred embodiment of the invention is clearly described and illustrated.

In the drawings:

Fig. 9 is a fragmentary sectional view taken substantially on a line 9—9 of Fig. 8 and in the direction of the arrows.

Figs. 10 and 11 are isometric views of certain parts of the machine.

Fig. 17 is a section taken substantially on a line 17—17 of Fig. 13 and in the direction of the arrows.

Fig. 18 is a fragmentary sectional view taken substantially on a line 18—18 of Fig. 13 and in the direction of the arrows.

Figs. 19 and 20 are respectively fragmentary sectional and plan views of a portion of the machine.

Throughout the specification, like reference numerals refer to similar parts that perform similar functions.

Figure 1:
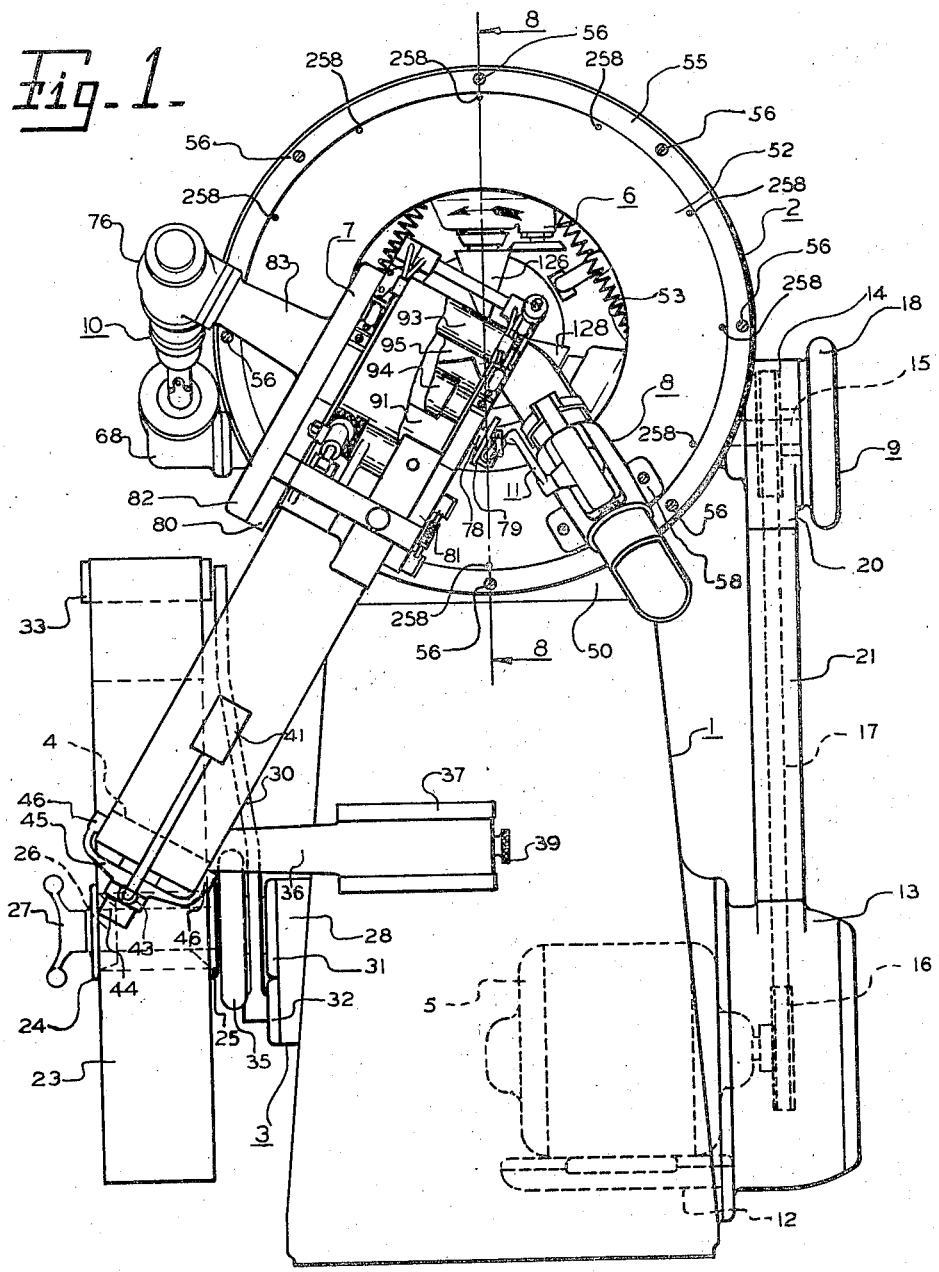
Figs. 1 and 2 are respectively front and side elevations of an assembled machine which comprises a preferred embodiment of the present invention.
Figure 2:
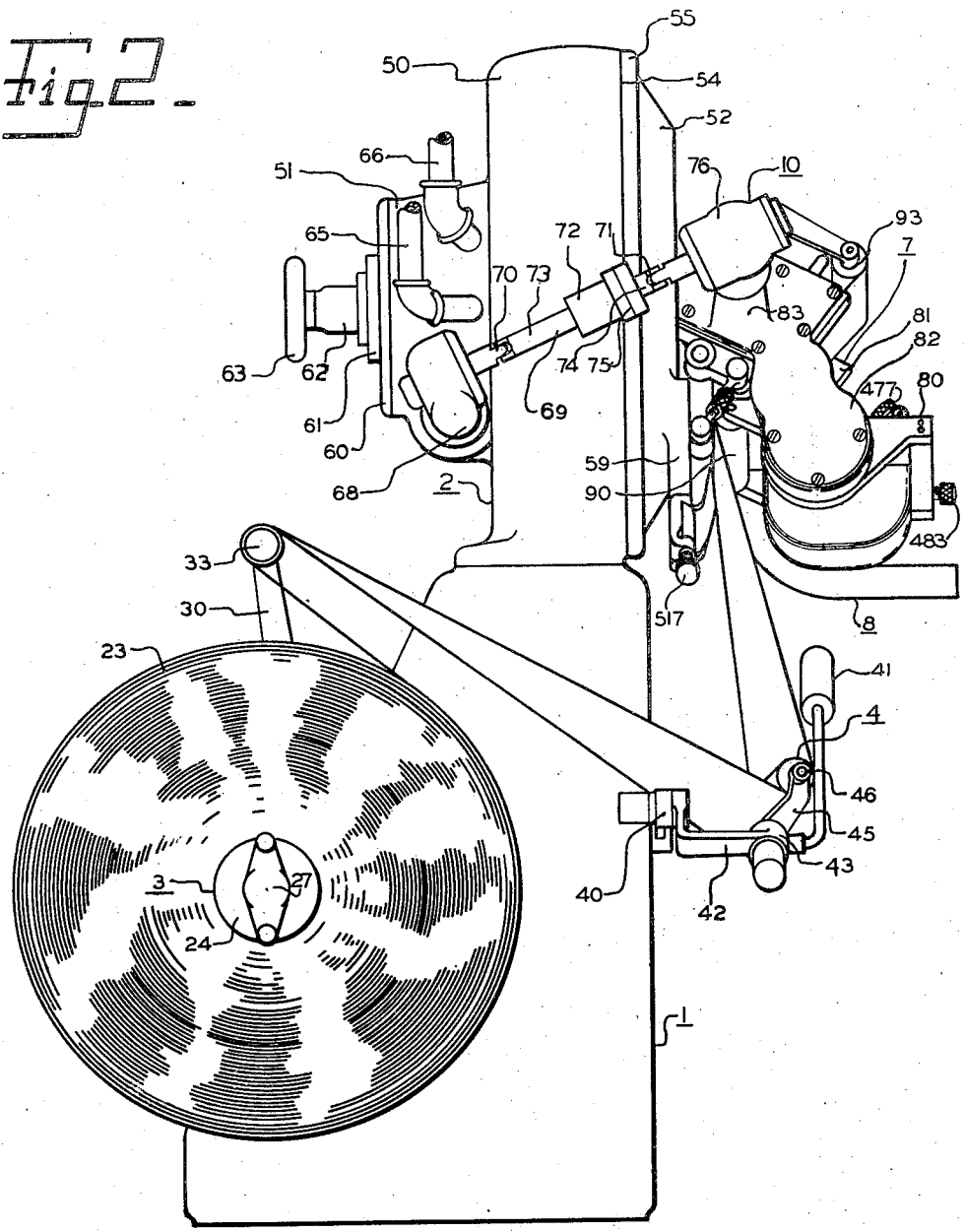

Figs. 1 and 2 show the general arrangement and construction of a preferred embodiment of a machine for producing containers from sheet stock, the particular preferred arrangement of the component parts of which will be explained with respect to these and other figures of the drawings. A base 1 provides a support for a turret head 2, an unwinder 3, and an adjustable gimbally mounted roller 4, and provides a housing for a prime mover 5 which is preferably an electric motor. The turret head 2 includes a forming mechanism 6 and has adjustably secured thereto a feeding mechanism 7 and a stacker 8. The forming mechanism 6 is driven from a main drive 9, and the feeding mechanism 7 is also driven from the main drive 9 through a feeder drive 10. A stacker mechanism 11 is also driven by the feeder drive 10.

The prime mover 5 is mounted on a support 12 that is preferably secured to an auxiliary pulley housing 13; the pulley housing 13 being removably secured to the base 1. The main drive 9 includes a pulley 14 which is secured to a rotatably supported main drive shaft 15. A pulley 16 is secured to the shaft of the prime mover 5, and the pulley 14 is drivingly connected to the pulley 16 by a driving element 17 which is preferably a belt. A hand wheel 18 is secured to the end of the main drive shaft 15 to provide for manual operation of the machine. A housing 20 cooperates with the hand wheel 18 to provide an enclosure for the pulley 14, a portion of the main drive shaft 15 and a portion of the belt 17. Another housing 21 extends between the housing 20 and the pulley housing 13.

The unwinder 3 is preferably mounted on the back of the base 1 and extends outwardly from the base opposite the pulley housing 13. In this unwinder, a roll of sheet stock 23 is clamped between flanged core centers 24 and 25, which core centers secure the roll of sheet stock 23 to an unwinder shaft 26 that is substantially freely rotatable. The clamping of the roll of sheet stock between the flanged core centers 24 and 25 is effected by a manually operable member 27 that is threaded into the end of the shaft 26. The unwinder shaft 26 is supported by bearings which are enclosed in a housing 28; the housing 28 preferably being adjustable with respect to the base 1 and in a direction parallel to the axis of the shaft 26 to vary the position of the roll of sheet stock 23 with respect to the base 1. The housing 28 also preferably includes bearings for fulcruming a take-up lever 30. Bearing caps 31 and 32 are secured to the end of the housing 28 and cover the ends of the bearing which support the unwinder shaft 26 and fulcrum the take-up lever 30. An idle roller 33 is rotatably secured to the take-up lever 30 at a distance from the fulcrum support therefor and in substantial alignment with the roll of stock 23. The take-up lever 30 is spring biased in one direction, and is connected by a link mechanism, not shown, to a conventional type of shoe brake indicated at 35, so that movement of the take-up lever against the normal bias releases the brake to reduce the resistance to the movement of the unwinder shaft 26. This action of the take-up lever and brake maintains constant tension on the stock.

Sheet stock from the roll 23 passes over the idle roller 33 on the take-up lever 30 and under the adjustably supported and gimbally mounted idle roller 4 to the feeding mechanism 7. The adjustably supported and gimbally mounted roller 4 supports the stock in proper relation to the feeder, so as to maintain tension between the stock roll and the feeder, which tension is kept uniform by the take-up lever and brake. To accomplish the adjustable mounting of the gimbally mounted roller 4, a support arm 36 is secured to the base 1 and is slidably adjustable with respect to the base 1 in a channeled slide 37 that is preferably integral with the base. The position of the arm 36 is determined by adjustment of a thumb screw 39. The extending end of the support arm 36 has a bearing at 40 which receives a shaft that extends from a bracket 42 to provide a fulcrum mounting for the said bracket. The bracket 42 has a bearing at 43 in which a shaft that extends from a yoke 45 is fulcrumed. The axis about which the yoke 45 is fulcrumed is preferably substantially at right angles to the axis about which the bracket 42 is fulcrumed. The yoke 45 has bearings at 46 which rotatably support the roller 4. To assist in obtaining freedom of movement of the bracket 42 and yoke 45 about their respective fulcrums, it is preferable that the fulcrum axes of the bracket 42 and yoke 45 intersect at the center of gravity of the roller 4, and that a counterweight 41 of proper mass is secured to the end of the bracket 42 to effect proper balance for the rotation of the bracket and yoke about the fulcrum bearing 40.

The turret head 2 includes a turret housing 50 which is preferably removably secured to the base 1 and which preferably includes an integral projecting housing portion 51. A turret housing cover plate 52 having an opening 53 therein is held in position against a face 54 of the turret housing 50 by a clamping ring 55 and cooperating screws or other suitable fastening means as indicated at 56. The opening 53 in the housing cover plate 52 provides access to the forming mechanism 6. The stacker 8 is supported adjacent the cover plate 52 by a bracet 58. Also, the feeding mechanism 7 is secured to the cover plate 52 by a bracket 59 that is preferably integral with the housing cover plate 52; the feeding mechanism 7 being adjustable with respect to the cover plate 52 and forming mechanism 6 by a structure including the bracket 59 which will be more fully described. The turret housing 50 and turret housing cover plate 52 being preferably substantially circular, the feeding mechanism 7 and stacker 8 are circumferentially adjustable with respect to the forming mechanism 6 by rotation of the housing cover plate 52 when the screws or fastening means 56 are loosened to permit such rotation. The projecting housing portion 51 has removably secured thereto a bearing support and cover plate 60, a bearing cover plate 61 and a spring housing 62 which will be more fully disclosed and described. Also, a hand wheel or suitable manually adjustable member 63 is provided for manually adjusting a part of the forming mechanism, as will be more fully described. Pipes or other suitable means 65 and 66 provide communicating passages for air pressure below and above normal atmospheric pressure, respectively; and although only partially shown, the pipe 65 extends to a suitable vacuum pump and the pipe 66 extends to a suitable pressure pump. These pipes communicate with other suitable communicating connections within the turret head 2.

The main drive shaft 15 extends through the projecting turret housing portion 51 and into a gear housing 68 which encloses gears that comprise a portion of the feeder drive 10; the main drive shaft 15 being rotatably mounted in bearings within the projecting housing portion 51. The gear housing 68 encloses gears which change the direction of the transmitted motion from the main drive shaft 15 to a feeder drive shaft 69, which feeder drive shaft includes universal joints at 70 and 71 and a coupling unit 72. A portion 73 of the shaft 69 is connected by a spline to the coupling unit 72. A joint on a line 75 of the coupling unit provides a means for adjustment for effecting proper timing of the feeding mechanism 7 with respect to the forming mechanism 6. The spline connection between the portion 73 of the shaft 69 and the coupling unit 72 is provided to effect compensation in the length of the shaft 69 necessitated by adjustment of the position of the feeding mechanism 7 by rotation of the housing cover plate 52 and feeding mechanism 7. A gear housing 76 encloses gears which again change the direction of the drive from the main drive shaft 15 and shaft 69 to drive a feeder drive shaft 78. The feeder drive shaft 78 extends from the gear housing 76 through the feeding mechanism 7 and has a disc or flange 79 mounted on the end thereof to which the stacker mechanism 11 is drivingly connected. The feeding mechanism 7 has side frames 80 and 81 for supporting the parts thereof and has a gear housing 82 secured to one side of the side frame 80. A portion 83 of the gear housing 82 which is preferably integral therewith provides an enclosure for the feeder drive shaft 78 and a support for the gear housing 76. To provide compensation for adjustments of the position of the feeding mechanism 7, the gear housing 68 is adjustable with respect to the housing portion 51 by rotation thereof about the axis of the main drive shaft 15, and the gear housing 76 is adjustable with respect to the housing portion 83 by rotation thereof about the axis of the feeder drive shaft 78. The gear housings 68 and 76 have bearings therein for supporting the shaft 69 and one end of the feeder drive shaft 78.

Figure 3:
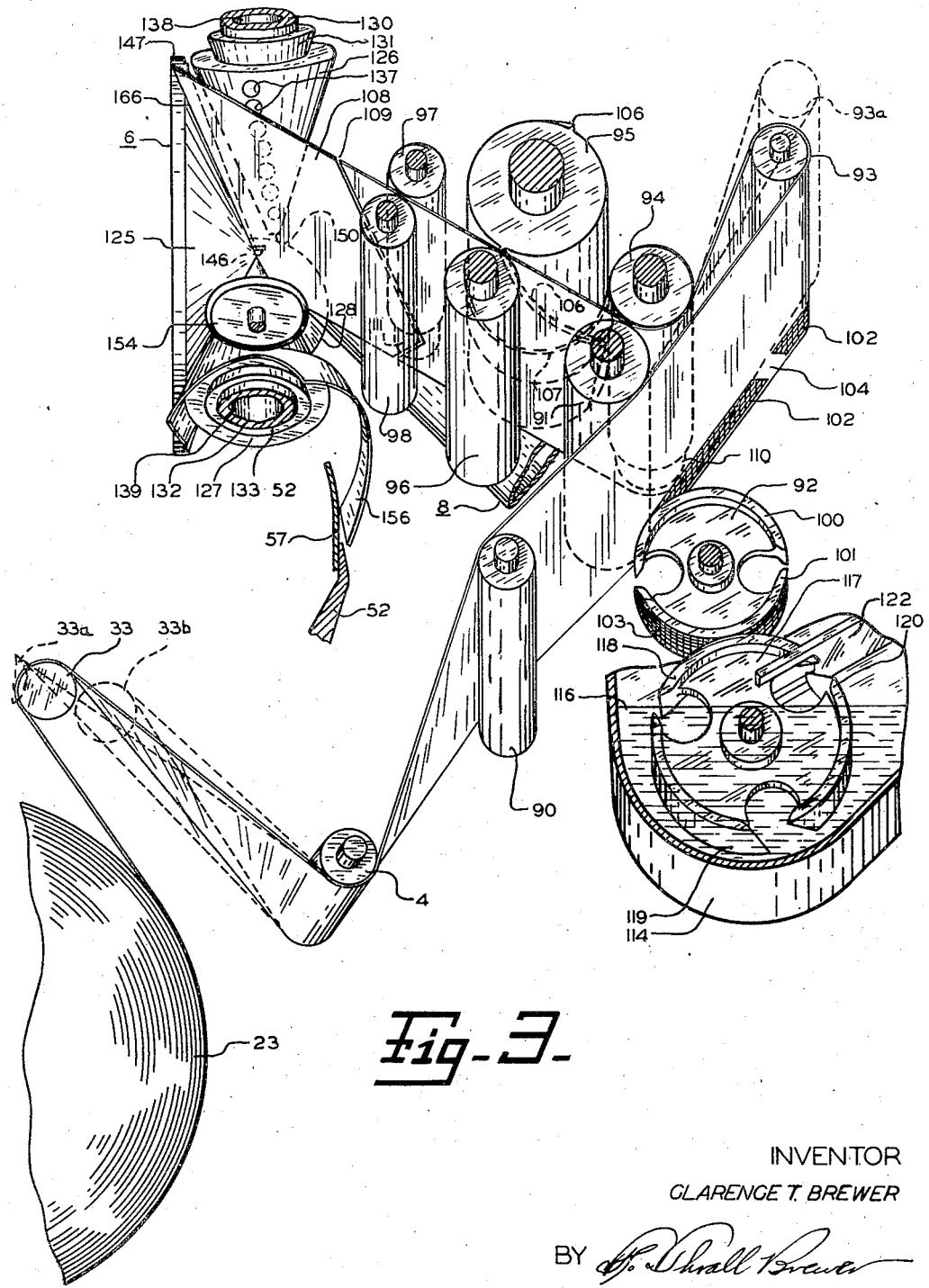
Figs. 3, 4, 5 and 6 are fragmentary diagrammatic views of certain parts of the machine shown in Figs. 1 and 2 which illustrate the relation between those parts and the sequence of operations thereof.
Figure 4:
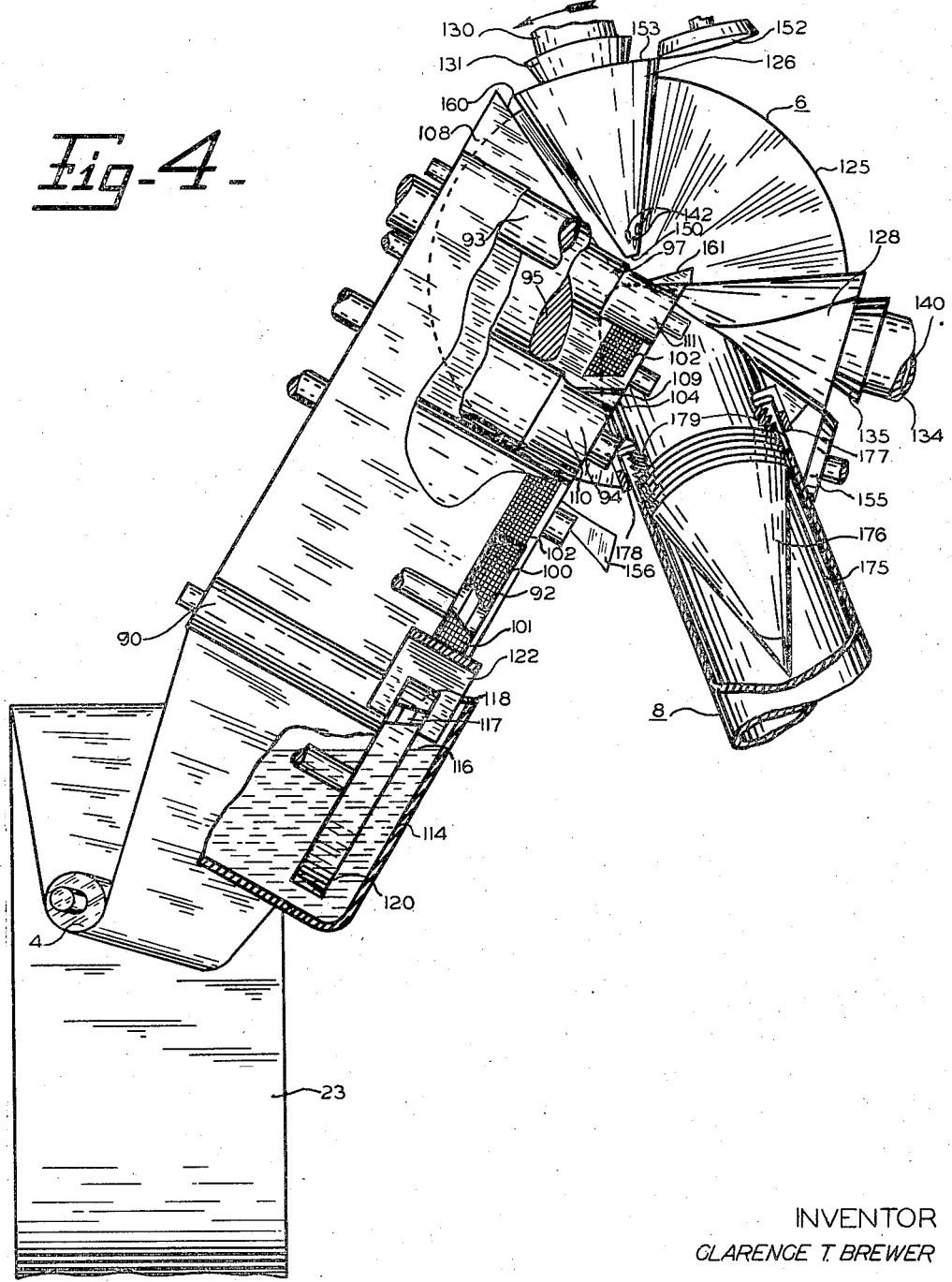

As illustrated in the diagrammatic illustrations of Figs. 3 and 4, stock from the roll 23 is drawn over the idle roller 33, under the gimbally mounted roller 4 over an idle roller 90, between a driven roller 91 and a driven cement transfer roller 92, over an adjustably mounted idle roller 93, between the driven roller 91 and a cooperating driven roller 94, between a cutting cylinder 95 and a cooperating driven backing cylinder or anvil roll 96, and then between cooperating driven feeding rollers 97 and 98 to the forming mechanism 6. As described in connection with Figs. 1 and 2, the idle roller 33 is mounted on the take-up lever 30, and this take-up lever 30 is fulcrumed and controls a brake for retarding and controlling the movement of the roll of stock 23. In effecting this control with the brake 35 to keep the paper taut, the position of the roller 33 may shift as indicated by the dotted lines at 33a and 33b. The gimbally mounted roller 4 supports the stock in proper relation to the feeder and keeps the tension practically uniform over the width of the surface of the stock. The idle roller 90 urges the stock into engagement with the driven roller 91 which acts as a backing roller or anvil for the cement transfer roller 92. The cement transfer roller 92 has segments 100 and 101 of predetermined shape which apply cement to a predetermined portion of the stock, as at 102, while the stock is in motion. The surfaces of the segments 100 and 101 are preferably circumferentially, spirally, diagonally or axially grooved as indicated at 103 to improve the cement transferring action of the segments by providing minute channels for carrying cement. The grooves or minute channels preferably extend to the outer edges of the segments 100 and 101 to effect the escape of air when cement enters the grooves and the influx of air when cement is transferred from the grooves to the stock. The separation of the segments 101 and 102 provides a separation, as at 104, between the cement strips for each container blank. The stock is looped over the adjustably mounted idle roller 93, and that roller is adjusted to a position such as that indicated by the dotted lines at 93a to change the length of the loop in the stock and thus phase the spaces 104 between the cemented portions 102 of the stock with respect to knives 106 on the cutting cylinder 95. The stock is gripped between the driven rollers 91 and 94, so that those rollers transmit the motive power to the stock for moving the stock from the roll 23 to the cutting cylinder 95. The pitch diameter of the cutting cylinder 95 which carries knives 106 is determined by the pitch length of the blank to be cut from the stock and the number of knives used or the number of blanks to be cut per revolution of the cutting cylinder. The shape of the knives 106 determintes the shape of the blanks cut thereby. The cutting cylinder 95 is preferably adjustable toward and away from the backing cylinder or anvil roll 96 to obtain the proper relation between the backing cylinder 96 and the knives or cutters 106 to effectively cut the blanks from the stock without dulling the edges of the knives or cutters. The cutting cylinder has a collar 107 circumferentially disposed on the surface thereof for preventing the cemented portions of the stock from contacting the cutting cylinder. The collar has an outside diameter such that when the knife 106 contacts the backing roller 96, the stock passes freely between the backing cylinder or anvil roll 96 and collar 107. The backing cylinder or anvil roll 96 is preferably hardened and is so positioned that it normally engages the stock between the driven rollers 91 and 94 and the feeding rollers 97 and 98. The driven feeding rollers 97 and 98 preferably have their cylindrical surfaces, which contact the stock, covered with rubber or other suitable material having a high coefficient of friction. These driven feeding rollers 97 and 98 grip the stock after it has passed the cutting cylinder 95 and preferably have a higher surface speed than the driven rollers 91 and 94, so as to slightly stress the stock between the rollers 97 and 94. This increased surface speed of the driven feeding rollers 97 and 98 also effects a separation of a cut blank such as 108 from the stock, as indicated at 109. The rollers 94 and 97 respectively have portions 110 and 111 of reduced diameter so positioned that the cemented portions of the stock pass without contacting the rollers. The idle roller 90, driven rollers 91, 94, 96, 97 and 98 and the cutting cylinder 95 are rotatably supported by the feeder side frames 80 and 81 as disclosed in Figs. 13 to 18 inclusive; and the idle roller 93 is adjustably supported from the feeder side frames 80 and 81 as also disclosed in Figs. 13 to 15 inclusive.

A cement reservoir 114 holds a supply of cement, the level of which is indicated at 116. A driven cement pick-up roller 117, preferably having segments such as 118, 119 and 120 which correspond in size and shape to the segments 100 and 101 of the transfer roller 92, is rotatably supported within the cement reservoir 114, so that it extends below the cement level 116 and dips into the cement supply. The surfaces of the segments 118, 119 and 120 of the cement pick-up roller 117 substantially contact the surfaces of the segments 100 and 101 of the cement transfer roller 92 during the rotation of the rollers, so that the pick-up roller 117 carries cement from the reservoir 114 to the segments 100 and 101. An adjustably mounted stripper 122 removes excess cement from the surfaces of the segments 118, 119 and 120 of the roller 117 and controls the amount of cement transferred from the segments of the pick-up roller 117 to the segments of the transfer roller 92. In the consideration of the cement transfer roller 92 and the cement pick-up roller 117, it is worthy of note that it is particularly advantageous to have an odd number of segments, such as 118, 119 and 120 on one of the rollers and an even number of segments, such as 100 and 101 on the cooperating roller, so that the cooperating segments of the two rollers 92 and 117 are varied in successive revolutions of the rollers. The alternate contacting of segments effected by this arrangement prevents cumulative disadvantageous results that might be produced by the contacting of the same segments at each revolution, such as the accumulation of foreign substance on the surface of one of the rollers.

Figure 5:
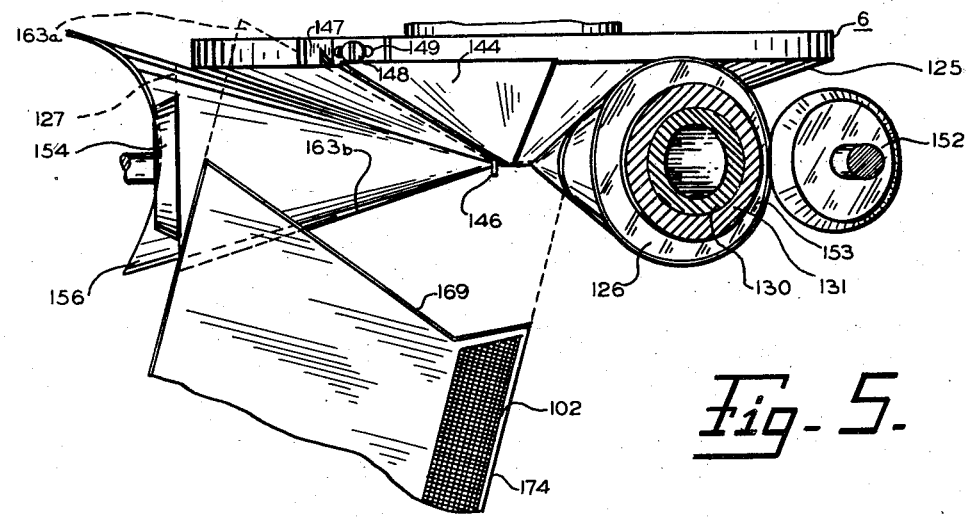
Figure 6:
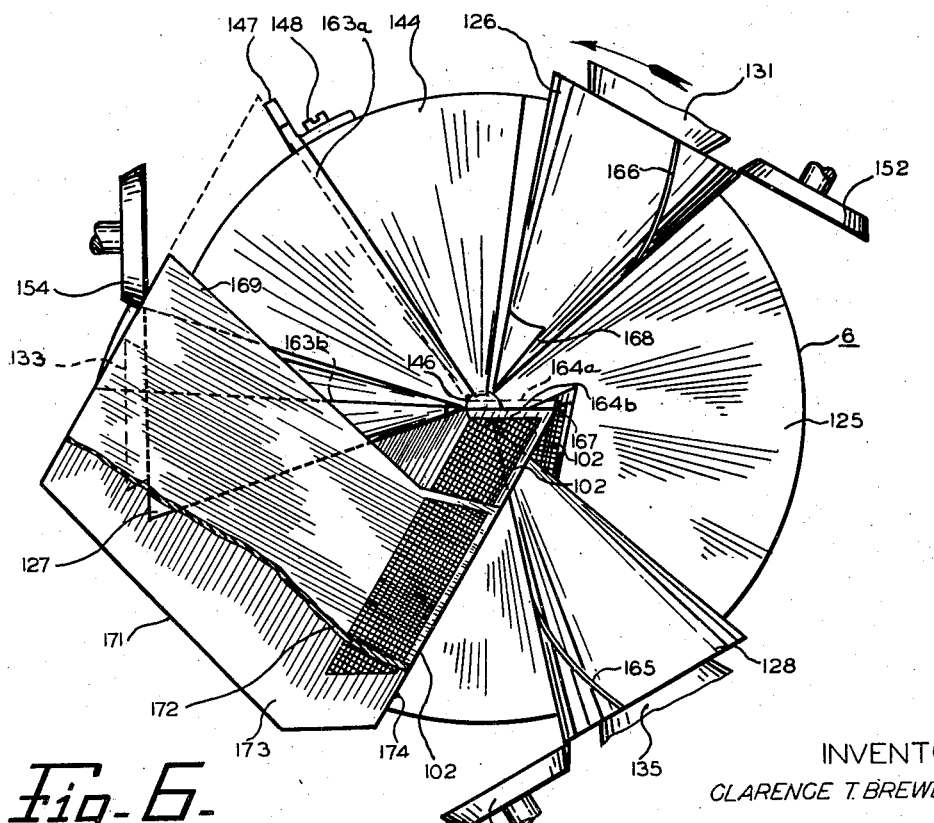

For consideration of the fundamental structure of the forming mechanism 6 and the relation between the forming mechanism 6 and feeding mechanism 7, particular reference is made to Figs. 5 and 6 together with Figs. 3 and 4. In the forming mechanism 6, a backing cone or anvil 125 is preferably stationary, although it may be supported through a bearing so as to be substantially freely rotatable about a stationary shaft having an axis corresponding to the cone axis thereof. Although only a single forming cone might be used in cooperative relation with the backing cone or anvil 125, it is preferable from the standpoint of balance, production speed and efficiency to use a plurality of equiangularly disposed forming cones or mandrels such as 126, 127 and 128 which normally have their conical surfaces substantially tangentially disposed with respect to the conical surface of the backing cone or anvil 125. The forming cone or mandrel 126 is secured to a spindle 130 by a retaining nut 131; the forming cone or mandrel 127 is secured to a spindle 132 by a retaining nut 133, and the forming cone or mandrel 128 is secured to a spindle 134 by a retaining nut 135, each of said spindles being substantially axially disposed with respect to its respective forming cone or mandrel and rotatably supported. Besides being axially rotatable with their respective spindles, the forming cones or mandrels 126, 127 and 128 are mechanically connected and adapted to be driven from a unitary drive mechanism, disclosed in Fig. 8, for movement in a substantially circular path with respect to the backing cone or anvil 125.

The forming cones or mandrels 126, 127 and 128 are preferably made of hardened steel. These forming cones provide mandrels upon which blanks of sheet stock are wrapped into containers. The size and shape of the forming cones or mandrels determines the size and shape of the containers that are wrapped thereon. It is understood, as previously indicated, that complete conical containers may be made on the mandrels as illustrated, and also that other container parts such as the tapered side walls of flat bottom containers may be made on a machine embodying the same principles and construction. In order that a blank of sheet stock may be completely wrapped into a container during each cycle of movement of each of the forming cones or mandrels 126, 127 and 128, the surface area of the backing cone or anvil 125 must be so related to the surface areas of the forming cones or mandrels that the number of wraps required by blanks of a predetermined size and shape are completed during each cycle of movement of each of the forming cones or mandrels. That is, the ratio of the surface area of the backing cone to the surface areas of each of the forming cones or mandrels is at least partially defined by the number of wraps required to form a given blank. Although the axes of the forming cones or mandrels 126, 127 and 128 normally pass substantially through the axis of the backing cone, it has been found to be advantageous to slightly offset the axes of the forming cones or mandrels slightly to one side of the other of the axis of the backing cone or anvil to effect a tightening of the wrap of the blanks on the forming cones or mandrels.

A plurality of openings such as 137 in Fig. 3 are disposed along the surfaces of the forming cones or mandrels in position to register with the leading portion of the blanks, such as 108 when the forming cones or mandrels are in position to pick up the blanks and start the formation thereof on the forming cone or mandrel. The openings 137 are preferably connected through a suitable passage to axially disposed openings in the spindles, such as 138 in the spindle 130, 139 in the spindle 132 and 140 in the spindle 134. The openings 138, 139 and 140 communicate through suitable passages and valves and the pipe 65 shown in Fig. 2 to a suitable vacuum pump. The openings 137, thus connected with a vacuum pump, provide vacuum pick-up ports which hold the blank in the proper position on the forming cone or mandrel during at least one complete wrap of the blank on the forming cone or mandrel. Since the forming cones or mandrels preferably form a container during each cycle of movement, it is preferable that the pitch diameter of the backing cone or anvil 125 is a unitary multiple of the pitch diameter of the forming cones or mandrels 126, 127 and 128. From another point of view, the surface area of the backing cone or anvil 125 should be so related to the surface areas of the forming cones or mandrels 126, 127 and 128 that the forming cones will make a unitary number of revolutions in completing one circular cycle of movement with respect to the surface of the backing cone or anvil 125. A plurality of openings 142 in the forming cones or mandrels 126, 127 and 128 are preferably located near the small ends of the forming cones or mandrels and disposed at a suitable angle with respect to the axes of the mandrels. These openings 142 also preferably communicate through the openings 138, 139 and 140 in the spindles with the pipe 66 in Fig. 2 which is connected to an air pressure pump. The openings 142 provide blow off ports through which air under pressure is passed during a predetermined interval of each cycle of movement of the forming cones or mandrels to remove the formed containers from the forming cones or mandrels and eject those containers into the stacker 8. In one modification of the present invention, which is preferred, the forming cones or mandrels are lifted at a predetermined position during their cycles of movement to permit the formed containers to be blown off of the mandrels and into the stacker 8. The position of the raised forming cone or mandrel is illustrated by the forming cone or mandrel 126 in Fig. 3. In another modification of this invention, the necessity of raising the mandrels or moving them away from the backing cone or anvil 125 is eliminated by recessing a portion 144 of the surface of the backing cone or anvil 125, so that there is a clearance between the surfaces of the formed containers and the recessed portion 144 of the surface of the backing cone or anvil 125. The recessed portion 144 of the backing cone or anvil 125 is sufficiently recessed to permit the blowing of the containers from the mandrel by air through the openings 142. It is also understood that the recessed portion 144 in the surface of the backing cone or anvil 125 may be utilized in addition to the separation of the forming cones or mandrels from the backing cone or anvil, as indicated in Fig. 3, to reduce the necessary separation of the forming cones or mandrels from the backing cone or anvil effected by movement of the forming cones or mandrels.

Although not absolutely essential to the operation of the machine, it is desirable to utilize blank locating instrumentalities 146 and 147 to properly locate the leading edges of the blanks, such as 108, as they are fed from the feeding mechanism 7 between one of the forming cones or mandrels and the backing cone or anvil 125 to be picked up and formed on the forming cone or mandrel. As is preferable, when the backing cone or anvil 125 is stationary, the locating instrumentality 146 comprises a pin secured to the backing cone or anvil 125 near the apex of the conical surface thereof. Also, when the backing cone or anvil 125 is stationary, the locating instrumentality 147 comprises a member secured to the periphery of the backing cone or anvil by a screw 148 or other suitable fastening means which extends through a slot 149 in the instrumentality 147 so as to be peripherally adjustable by loosening the screw 148. When the backing cone or anvil 125 is rotatably supported on a stationary support, so that it floats with respect to the support, the locating instrumentalities 146 and 147 are supported from the stationary support for the backing cone or anvil. In this latter case, the locating instrumentality or pin 146 preferably extends through a central opening in the backing cone or anvil 125 and the locating instrumentality 147 extends around the surface of the backing cone or anvil 125 from the stationary support. It is the purpose of the locating instrumentalities 146 and 147 to prevent the blank from being turned or skewed to an improper position when it is picked up by the forming cone or mandrel, and to insure proper register of the blanks with the forming cone or mandrel.

The locating instrumentality 146 projecting from the surface of the backing cone or anvil 125 makes it necessary that the points of the forming cones be eliminated, as at 150 of the forming cone or mandrel 126, so that the forming cones or mandrels pass the locating instrumentality 146 in their circular motion with respect to the backing cone or anvil 125. Also, to prevent congestion at the apex of the forming cone or mandrel 126 when a plurality of forming cones or mandrels are used, and to prevent rubbing of the points of conical containers as they are formed on the forming cones or mandrels 126, 127 and 128, it is desirable to set the forming cones or mandrels outwardly in the direction of the axes of the forming cones or mandrels. Since it is necessary to maintain the substantially tangential relation between the surface of the backing cone or anvil 125 and the surfaces of the forming cones or mandrels 126, 127 and 128, the outward placement of the forming cones or mandrels makes necessary a correction of the included angle of the backing cone or anvil 125 by decreasing that angle in amount such that slippage between the surfaces of the backing cone or anvil 125 and the forming cones or mandrels 126, 127 and 128 is reduced to a minimum on a line intermediate the axial extremities of the mandrels which preferably substantially circumferentially bisects the forming cone or mandrel surface areas.

A circular cutter 152 is rotatably mounted adjacent the outer flat surface or base 153 of the forming cone or mandrel 126 and overlaps the surface 153 to provide a shear for trimming the blanks as they are formed into containers. The circular cutter 152 is driven as shown in Fig. 9 so as to rotate with respect to the forming cone or mandrel 126 and travels with the forming cone or mandrel in its cycle of movement with respect to the backing cone or anvil 125. Similar circular cutters 154 and 155 cooperate with the forming cones or mandrels 127 and 128 respectively to trim the blanks that are formed on those forming cones or mandrels as they are formed. The cutters 152, 154 and 155 remove excess portions 156 of the blanks. Due to the relative positions of the forming cones or mandrels 126, 127 and 128 with respect to the housing cover plate 52 and an apron 57 that is secured to the cover plate, the excess portions 156 fall outside of that housing cover plate 52.

As indicated in Figs. 3 and 4, the major portions of the blanks 160, and particularly the parts which register with the forming cones or mandrels are substantially straight. As the blanks are fed from the feeding mechanism 7, the substantially straight portion 160 of the leading edge of the blank registers with the locating instrumentalities 146, 147, which locating instrumentalities are preferably practically on a line that is substantially parallel to a radius of the backing cone or anvil 125. As will be explained with respect to Fig. 13, the feeding mechanism 7 is angularly adjustable to effect this angle of feed with respect to the backing cone or anvil 125. The leading edge of the blank 108 also preferably has a portion 161 which is angularly disposed with respect to the portion 160 of the leading edge. With blanks of the form shown, the blanks are preferably so laterally disposed with respect to the forming cones or mandrels 126, 127 and 128 that the apex of the formed container falls substantially at the apex of the angle formed by the portions 160 and 161 of the leading edge of the blank 108. Both the lateral and angular disposition of the blanks with respect to the forming and backing cones are factors which vitally affect the constant production of containers that do not leak at the apex. Although it is preferable to feed the blanks such as 108 between the forming cones or mandrels 126, 127 and 128 and the backing cone or anvil 125 with the blank in a plane as nearly tangent as possible to the pitch cone radii of the cooperating conical surfaces, it is necessary, when a plurality of forming cones or mandrels are used, to feed the blanks at an angle which permits the forming cone or mandrel which immediately precedes the one to which the blank is being fed to pass between the feeding rollers 97 and 98 and the backing cone or anvil 125. This last mentioned angle of feed is partially controlled by the distance of the feeding rolls 97 and 98 from the surface of the backing cone or anvil 125 and the dimensions of the forming cones or mandrels 126, 127 and 128. Also, the distance of the feeding rollers 97 and 98 from the line at which the leading edges of the blanks are picked up by the forming cone or mandrel is at least partially determined by the length of the blanks; it being recalled that it is preferable for the vacuum pick-up ports of the forming cone or mandrel to engage and secure the position of the blanks just prior to the release of the blanks by the feeding rollers 97 and 98. As previously described in connection with Figs. 1 and 2, the feeding mechanism 7 and stacker 8 are circumferentially adjustable with respect to the backing cone or anvil 125 by rotation of the turret housing cover plate 52. With the disclosed arrangement of the feeder 7 and stacker 8 with respect to the backing cone or anvil 125, it is convenient to feed the stock through the cutter and feeding mechanism with the roll of stock disposed at a convenient location on one side of the machine; and in addition to this convenient location of the stock roll, the containers are discharged or ejected downwardly into the stacker 8.

For the purpose of illustrating the sequence of the operations of the different forming cones or mandrels 126, 127 and 128, those forming cones or mandrels are illustrated in a somewhat different position in Figs. 5 and 6 than they are in Figs. 3 and 4. Having particular reference to Figs. 5 and 6, the dotted lines 163a indicate the position of the leading edge of the blank that is being formed on the forming cone or mandrel 127 at 163b; the dotted line 163a indicating the position of the blank at the time it was picked up for formation by the forming cone or mandrel 127. Corresponding to the dotted line 163a, the dotted line 164a indicates the position of the angularly disposed portion of the leading edge of the blank at the time it was picked up by the forming cone or mandrel 127, and the line 164b indicates the position of that angularly disposed portion of the leading edge when the blank has been picked up and is in the position of formation indicated by the corresponding line of the leading edge of the blank at 163b. By comparison of the positions of the lines 164a and 164b, it will be noted that the blank, as well as being rolled around the forming cone or mandrel 127, has also slipped somewhat with respect to the backing cone or anvil 125. This slippage of the forming cones or mandrels with respect to the backing cone or anvil 125 is a factor, as previously mentioned, which effects tighter wrapping of the blanks on the forming cones or mandrels to further insure the prevention of leaks at the apex of conical containers. The lines 165 and 166 indicate the positions of the sides such as 174 of blanks being formed on the forming cones or mandrels 128 and 126 respectively in the position of those forming cones or mandrels which are indicated with respect to the forming cone or mandrel 127. Corresponding to the positions of the sides 165 and 166, the lines 167 and 168 indicate the corresponding positions of the angularly disposed portions of the leading edges of the blanks being formed on the forming cones or mandrels 128 and 126 respectively. Also, in Figs. 5 and 6, the line 169 indicates the position of the next succeeding blank which is being fed into the forming mechanism 6 at the time the preceding blanks are in the positions shown on the forming cones or mandrels 127, 128 and 126. The line 173 indicates the following edge of the blank having its leading edge indicated at 163b which is in the process of formation, and which has dropped down against the backing cone or anvil 125 ahead of the leading edge 169 of the succeeding blank; the following portion of which succeeding blank is indicated as being cut away at 172.

When one of the forming cones or mandrels 126, 127 or 128 reaches a position intermediate predetermined limits and such as that indicated by the position of the forming cone or mandrel 126 in Fig. 4, air pressure through the ports 142 ejects or blows the wrapped container off of the forming cone or mandrel into the stacker 8 which includes a tubular or cylindrical member 175 which frictionally engages the outer surfaces of the open ends of the containers 176 to hold those containers, as formed, until the cement has sufficiently set or dried. To effect close stacking of the containers 176, driven fingers 177 and 178 engage the open ends of the conical containers and move them successively downwardly into the tubular or cylindrical member 175 and past notched edges such as 179. The containers are ejected or blown off of the forming cones or mandrels 126, 127 and 128 with sufficient velocity to deform the containers sufficiently to pass the driven fingers 177 and 178 which push the containers into close juxtaposition for maintaining formation of the containers until the cement has set. It will be noted that by positioning the stacker 8 sufficiently close to the forming mechanism 6 and in the relation illustrated with respect to the apex or center of the backing cone or anvil 125, the containers may be ejected or blown off of the forming cones or mandrels over a comparatively wide range of positions of the forming cones or mandrels and still enter the opening of the stacker 8 at a proper angle for proper functioning of the stacking mechanism.

Having explained the general structure and arrangement of the machine as well as the relation and operation of some of the parts thereof with respect to Figs. 1 to 6 inclusive, the structural details of certain portions of the machine will be considered in more detail. Figs. 7 to 12 inclusive relate to details of the structure of the turret head and forming mechanism, and will consequently be considered together. In general, the turret head 2 includes the forming mechanism 6 and drive and control apparatus therefor. A stationary shaft 185 has the backing cone or anvil 125 secured to one end thereof within the turret housing 50, and is in turn supported at the end of the shaft near the backing cone or anvil 125 by an anti-friction bearing 186, and near the other end thereof by the bearing cover plate 61. The stationary shaft 185 preferably has an enlarged portion 187 which closely fits an opening 188 in the bearing cover plate 61 and preferably has a key at 189 which prevents rotation between the stationary shaft 185 and bearing cover plate 61. The bearing 186 is preferably secured to the stationary shaft 185 between a flange 190 on the shaft and a snap ring 191. Also, the bearing 186 is preferably slidable parallel to the axis of the stationary shaft 185 in a bearing support recess 192 in a turret spider 193, which turret spider is rotatably mounted in substantially concentric relation with respect to the stationary shaft 185 and has an opening 194 through which the stationary shaft 185 extends. The stationary shaft 185 has a portion 196 of reduced section which is threaded at 197 to accommodate a cooperatively threaded hand wheel or adjustable member 198. A compression coil spring 200 surrounds a part of the portion 196 of the stationary shaft 185 and has one end engaging a washer 201, and its other end engaging the spring housing 62 to axially bias the stationary shaft 185 toward the forming cones or mandrels 126, 127 and 128. The hand wheel or adjustable member 198 that is threaded on the end of the stationary shaft 185 engages the spring housing 62 and controls the axial position of the stationary shaft 185, and also the position of the backing cone or anvil 125 with respect to the forming cones or mandrels 126, 127 and 128 in the direction of the axis of the stationary shaft 185.

The turret spider 193 is rotatably supported by anti-friction bearings 205 and 206; the bearing 205 being supported by a web 207 that is preferably integral with the turret housing 50 and projecting housing portion 51, and the bearing 206 being supported in an opening 208 in the cover plate 60 and covered by the bearing cover plate 61. The bearing 205 is held in position with respect to the web 207 between a retaining shoulder 210 on the web 207 and a stationary valve member 211 that is removably secured to the web 207 by screws or other suitable fastening means such as 212. The worm wheel 213 is mounted on the turret spider 193 between the bearings 205 and 206 and is drivingly connected to the turret spider by a key 214. The bearings 205 and 206 and the worm wheel 213 are axially located with respect to the turret spider 193 by shoulders 215, 216 and 217 on the turret spider 193 and spacing washers 218 and 219; the bearings 205 and 206 and worm wheel 213 being axially secured in position with respect to the turret spider 193 by a nut 220 threaded onto the turret spider and engaging the bearing 206. The main drive shaft 15 has a worm gear 221 drivingly connected thereto by a key 222, which worm gear 221 meshes with the worm wheel 213 to drive the worm wheel 213 and turret spider 193 from the main drive shaft 15.

The turret housing 50 has secured thereto by screws or other suitable fastening means 224 a stationary ring gear 225 which meshes with beveled spindle drive gears such as 226 which are drivingly connected to the spindles 130, 132 and 134; the pitch diameters of the gears 225 and 226 being substantially on a line with the pitch cone radius of the backing cone or anvil 125 and the forming cones or mandrels 126, 127 and 128. An extending flange portion 229 of the turret spider 193 carries spindle drive housings 230, 231 and 232 which respectively rotatably support the spindles 130, 132 and 134; the spindle drive housings respectively enclose the beveled gears such as 226 and are fulcrumed to the rotatable turret spider flange 229 on fulcrum axes such as 236 in Fig. 8. The spindle drive housings 230, 231 and 232 each have a projecting portion such as 240, which respectively support stationary studs 243, 244 and 245 which extend substantially radially with respect to the turret spider 193 and respectively support anti-friction cam rollers 246, 247 and 248 on the outer ends thereof. The cam rollers 246, 247 and 248 are held in position between flanged ends such as 249 on the studs 243, 244 and 245 respectively and the projecting portion such as 240, of the spindle drive housings. The studs 243, 244 and 245 are secured in position by nuts or other suitable fastening means such as 252. The cam rollers 246, 247 and 248 roll against a substantially circular stationary cam 255 which is closely fitted into an inner surface 254 of the turret housing 50 and adjustable axially of the turret by adjustment of screws 258 which are threaded into the turret cover plate 52, and which is substantially concentric with respect to the turret spider 193 and shaft 185. The cam 255 is prevented from rotating in the turret housing by a key 259. Also the stationary cam 255 preferably has a camming surface 256 which is substantially plain except for a smoothly curved raised portion 257 shown in Fig. 12. The projecting portion such as 240 of the spindle drive housings 230, 231 and 232 being displaced from the fulcrum axes such as 236, the portion 257 of the camming surface rocks the spindle drive housings 230, 231 and 232 about their respective fulcrum axes such as 236, to effect a separation between the backing cone or anvil 125 and the respective forming cones or mandrels 126, 127 and 128 during a predetermined portion of each revolution of each of the forming cones or mandrels with respect to the backing cone or anvil. This separation between the forming cones or mandrels 126, 127 and 128 and the backing cone or anvil 125 is provided, as previously explained, for removal of the formed containers from the mandrels. The fulcrum supports for the spindle housings 230, 231 and 232 are provided by axially aligned studs such as 260 and 261, shown in Fig. 12, which are secured to opposite sides of the spindle drive housings and support the spindle drive housings through anti-friction bearings 262 and 263 respectively. The studs 260 and 261 have flanges 264 and 265 respectively which, together with cooperating nuts 266 and 267, serve to secure the studs to the spindle drive housings. The bearings 262 and 263 are mounted in bearing sleeves 250 and 251 which are held in place by caps 268 and 269 respectively, and which caps are preferably removably secured to the extending flange portion 229 of the turret spider 193 by screws or other suitable fastening means as indicated at 274 and 275 in Fig. 9. Like bearings for supporting spindle drive housings 231 and 232 are supported by bearing caps 270 and 271, and 272 and 273 respectively, which are removably secured to the extending flange portion by screws 276 and 278, and 279 and 280 respectively.

Because the movement of the spindle drive housings about their respective fulcrum axes such as 236 necessitates relative movement between the teeth of the bevel gears 225 and 226, it is preferable that the pitch line of the gears 225 and 226 is in substantial alignment with the pitch cone radii of the backing cone or anvil 125 and the forming cones or mandrels 126, 127 and 128. It is also preferable that the fulcrum axes such as 236 are substantially on the intersection of or tangent to the pitch diameters of the bevel gears 225 and 226, as well as at or closely adjacent and outside of the outer surfaces of the meshing teeth of the gears 225 and 226. The spindle drive housings are biased about their respective axes such as 236 by tension springs 282, 283 and 284. The spring 282 is connected at its ends to pins 285 and 286 that are respectively secured to the spindle drive housings 230 and 231. The spring 283 is connected to pins 287 and 288 that are respectively secured to the spindle drive housings 231 and 232. The spring 284 is connected to pins 289 and 290 that are respectively secured to the spindle drive housings 232 and 230. The springs 282, 283 and 284 bias the forming cones or mandrels 126, 127 and 128 toward the backing cone or anvil 125 and urged the cam rollers 246, 247 and 248 toward the surface of the cam 255.

Figure 8:
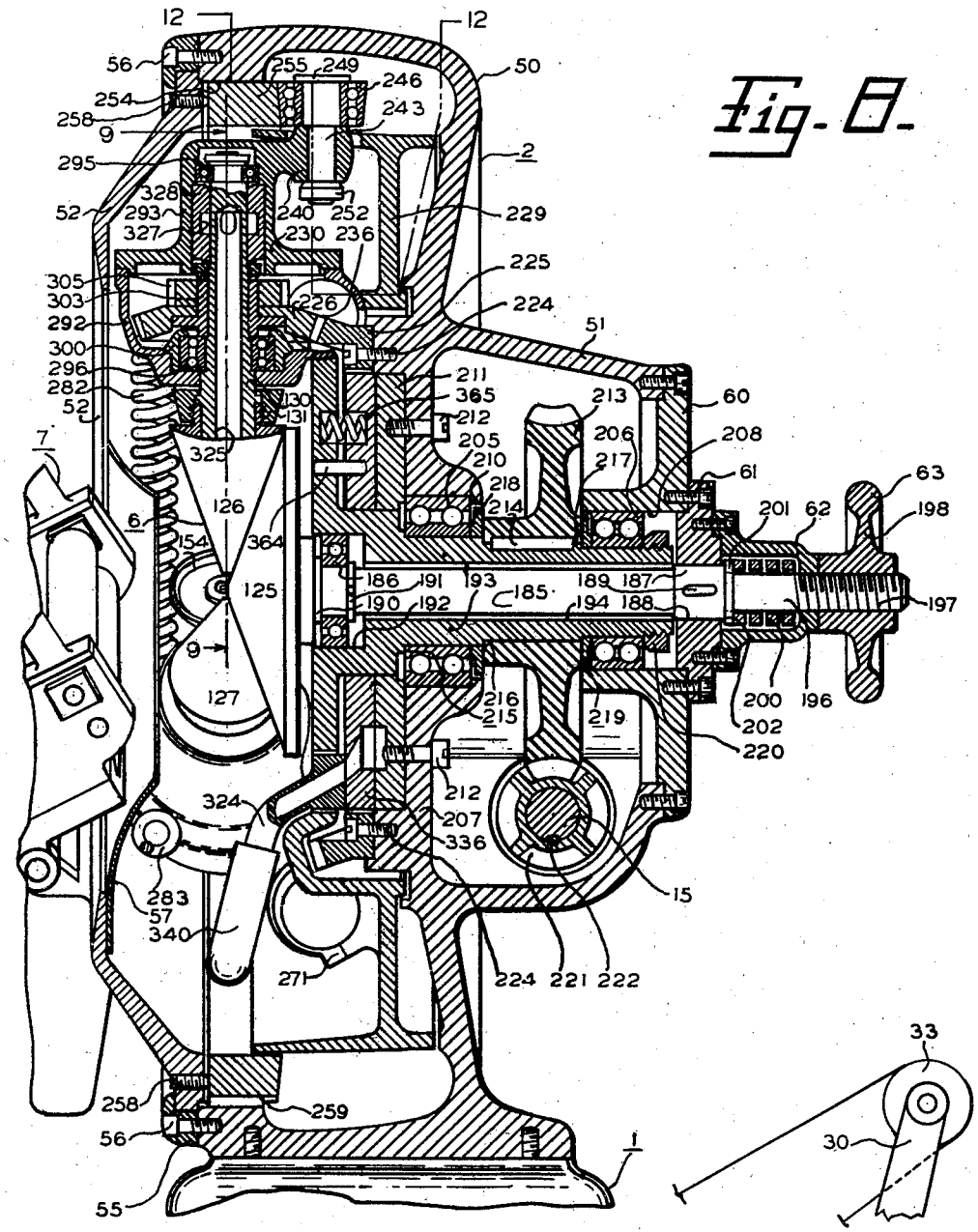
Fig. 8 is a sectional view of a portion of the machine taken substantially on a line 8—8 of Fig. 1 and in the direction of the arrows.
Figure 12:
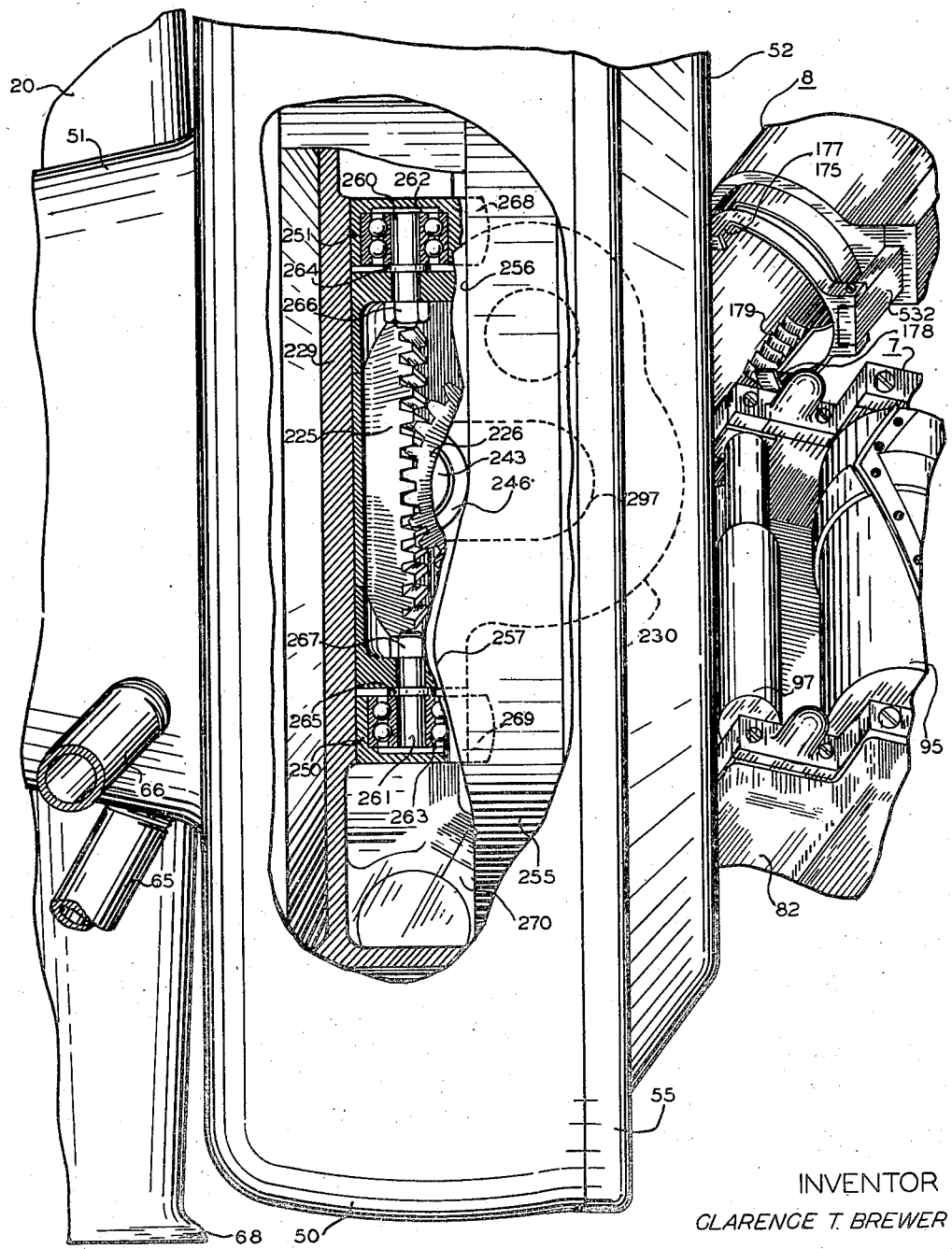
Fig. 12 is a fragmentary view looking down on the top of the machine and having a portion cut away and a section taken substantially on the lines 12—12 of Fig. 8.

The spindle drive housings 230, 231 and 232 have main or body portions such as 292 and cap portions such as 293 which are removably secured together by screws 294 or other suitable fastening means. Since the spindle drives for each of the spindles 130, 132 and 134 are alike, the explanation thereof will be limited to the structure for driving the spindle 130 which is illustrated in Figs. 8 and 9. The spindle 130 is rotatably supported in bearings 295 and 296. The bearing 295 is mounted in a projecting portion 297 of the spindle drive housing cap portion 293, and is retained in position on the end of the spindle between a shoulder 298 and a nut 299 that is threaded onto the end of the shaft. The bearing 296 is retained within the main or body portion 292 of the spindle housing by a bearing retaining sleeve 300 that is secured to the body portion 292 of the spindle housing by screws such as 301 or other suitable fastening means. The bearing 296 is retained in position on the spindle 130 between a shoulder 302 on the spindle and a flanged gear hub 303; the bearing 296 and gear hub 303 being urged toward the shoulder by a nut 304 that is threaded onto the spindle. The gear hub 303 is also preferably keyed to the spindle.

The beveled gear 226 and a gear 305 are both secured to the flanged gear hub 303 by screws such as 306 or other suitable fastening means. The spindle 130 has a flange 308 thereon outside of the spindle drive housing 230. The forming cone or mandrel 126 fits over a tapered end portion 310 of the spindle 130. The retaining nut 131 is threaded onto a threaded portion 309 of the forming cone or mandrel 126 and engages the flange 308 to pull the forming cone or mandrel back tightly on the tapered end portion 310. By loosening the retaining nut 131 the forming cone or mandrel 126 may be rotatably adjusted with respect to the spindle for close adjustment of the position of the vacuum ports 137.

A cutter shaft 311 is substantially parallel to the spindle 130 and rotatably supported by anti-friction bearings 312 and 313. The bearing 312 is located adjacent a shoulder 314 on the cutter shaft. A spacer sleeve 315 surrounds a portion of the cutter shaft and separates and spaces a gear 316 from the bearing 312. The bearing 313 is adjacent the gear 316 on the opposite side of the gear from the sleeve 315. The bearing 312, sleeve 315, gear 316 and bearing 313 are secured in position on the shaft 311 by a nut 327 that is threaded onto the end of the shaft. The cutter 152 is mounted at the end of the cutter shaft on a portion 319 of the shaft which is reduced in section. The cutter 152 is secured in position on the cutter shaft by a nut 320 that is threaded onto the end of the shaft. The cutter shaft 311 is adjustable longitudinally and positioned by a collar 321 that is threaded into the main portion 292 of the spindle drive housing and substantially concentric with the cutter shaft. The collar 321 engages the outer race of the anti-friction bearing 312. At the other end of the cutter shaft 311, a substantially cup-like cap 322 covers the end of the cutter shaft and engages the outer race of the anti-friction bearing 313. The cap 322 is slidably mounted in the cap portion 293 of the spindle drive housing substantially concentric to the axis of the cutter shaft, and is biased axially toward the cutter shaft by a compression spring 323. The gear 305 is preferably wider than the gear 316 to permit longitudinal movement of the cutter shaft 311 and the gear 316 with respect to the gear 305. The spacing between the axis of the spindle 130 and the cutter shaft 311 and the diameter of the cutter 152 are so related to each other and the dimensions of the forming cone or mandrel that the cutter overlaps the base of the forming cone or mandrel, so that the base surface of the forming cone or mandrel and the cutter provide a shear. The cutter 152 is urged toward the base of the forming cone or mandrel by the spring 323, but the threaded sleeve 321 axially adjusts the position of the cutter 152 to effect proper shearing action without excessive pressure between the cutter 152 and the base of the forming cone or mandrel 126. The spring 323 is preferably designed to have sufficient force to maintain proper shearing relation between the cutter 152 and the forming cone or mandrel 126 and to overcome the effect of centrifugal force due to the rotation of the spindle drive housing with respect to the backing cone or anvil 125 which normally tends to separate the cutter 152 from the base of the forming cone or mandrel 126.

Figure 7:
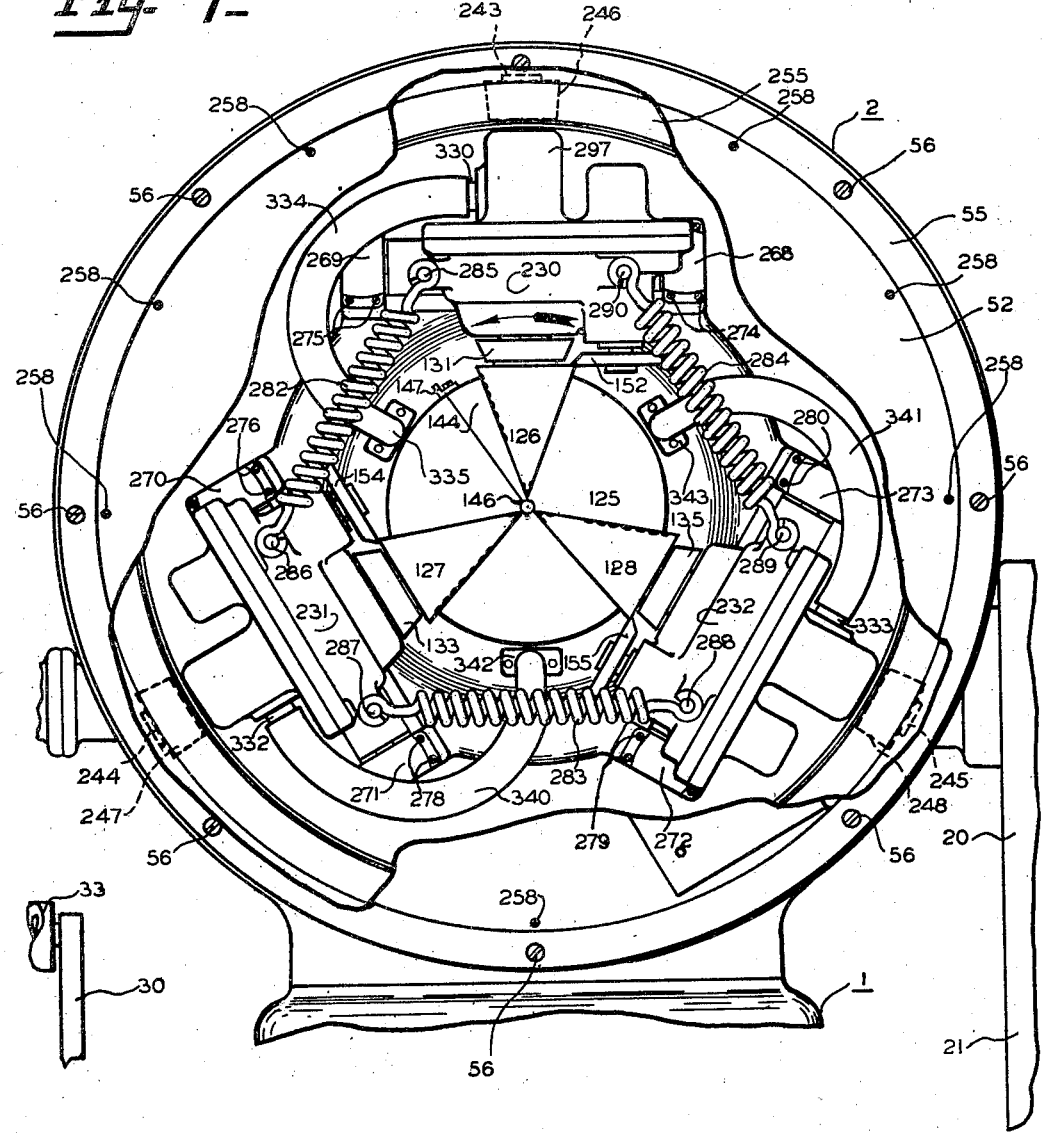
Fig. 7 is a fragmentary view of a portion of the machine shown in Figs. 1 and 2 having portions thereof cut away.

The spindle 130 has an axially extending opening 325 therein that communicates through a transverse opening 326 in the spindle with a circumferential channel 329 in the inner surface of a sleeve 328; the sleeve 328 being fitted to the spindle on both sides of the channel 329 and preferably being located intermediate the nut 304 and the bearing 295. A nipple 330 is threaded into the projecting portion 297 of the spindle drive housing and preferably engages the outer surface of the sleeve 328 to hold that sleeve in fixed position with respect to the spindle drive housing. A transverse opening 331 in the sleeve 328 provides communication between the channel 329 and the nipple 330. As indicated in Fig. 7, similar nipples 332 and 333 are provided for the spindle drive housings 231 and 232 respectively. The nipple 330 provides a connection for one end of a hose or other suitable connecting element 334 which is preferably flexible, and the other end of which is connected to a flanged coupling 335. The flanged coupling 335 is secured to a face of a rotary valve member 336 by screws or other suitable fastening means such as 337 and communicates with an opening 338 in that rotary valve member, which opening preferably has substantially radial side walls. Similar hoses or connecting elements 340 and 341 are provided for connecting the nipples 332 and 333 respectively with similar flanged couplings 342 and 343 which respectively communicate with similar valve openings 344 and 345. The vacuum pick-up ports 137 are interconnected by an opening 347 that is preferably drilled into the forming cone or mandrel 126 from the base thereof and closed at the base end by a plug 348. The opening 347 is in turn communicatingly connected through an opening 349 in the forming cone or mandrel 126 and a pair of openings 350 to the opening 325 in the spindle 130. The opening 349 has a shoulder at 351 which provides a seat for a ball 352 which serves as a ball check valve to control the direction of air flow through the opening 349. Another and preferably axial opening 353 in the forming cone or mandrel 126 is preferably enlarged at 354, adjacent the end of the spindle 130, and provides communication between the opening 325 of the spindle and the pair of blow off ports 142 near the end or apex of the forming cone or mandrel 126. The enlarged portion 353 of the opening has a cup-shaped member 355 and a cooperating cap 356 for the cup-shaped member disposed therein to provide a seat at 357 for a ball 358 which comprise a ball check valve to control the direction of air flow through the blow off ports 142.

As illustrated in Figs. 8, 9, 10 and 11, the stationary valve member 211 and the cooperating rotary valve member 336 have adjacent plane surfaces 360 and 361 respectively and central openings 362 and 363 respectively through which the rotary turret spider 193 extends. The rotary valve member 336 is drivingly connected to the turret spider 193 by pins such as 364, and is biased toward the stationary valve member 211 by compression springs such as 365 which are disposed between the turret spider 193 and the rotary valve member 336. The openings 338, 344 and 345 in the rotary valve member 336 are circumferentially disposed to correspond to the circumferential placement of the forming cones or mandrels 126, 127 and 128, and since those forming cones or mandrels are preferably equi-angularly spaced, the openings 338, 344 and 345 are also preferably equi-angularly spaced. An air pressure opening 367 in the stationary valve member 211 is communicatingly connected to the pipe 66 by suitable connecting means not shown, and a vacuum opening 368 in the stationary valve member 211 is communicatingly connected to the pipe 65 by suitable connecting means not shown. The pressure opening 367 in the stationary valve member 211 is so radially disposed that it becomes aligned with each of the openings 338, 344 and 345 in the rotary valve member 346 at each revolution of the rotary valve member 336 with respect to the stationary valve member 211 to provide compressed air at the blow off ports 142 at the proper time for ejecting the formed containers from the forming cones or mandrels. The opening 367 is preferably narrow, so that the air pressure for ejecting the containers is only applied for an interval of short duration. The opening 368 communicates with an arc like channel 369 in the surface 360 of the stationary valve member 211, the length of which arc is sufficient to apply vacuum to the vacuum pick-up ports 137 of the forming cones or mandrels over a sufficient period to complete at least a full wrap of the blanks on the mandrels. During the operation of the machine, the check valve including the ball 358 closes the opening in the cap 356 during the time that vacuum is applied to the vacuum pick-up openings 137. Also, the check valve including the ball 352 closes the opening 349 during the time that compressed air is applied to the blow off ports 142 for ejecting the finished containers. The valve members 211 and 336 which cooperate to control the vacuum and compressed air are preferably located near the forming cones or mandrels to reduce the air space between the valves and the forming cones or mandrels and to thereby avoid lag and increase the accuracy and efficiency of the timing of the application of the vacuum and air pressure at the vacuum pick up ports and blow off ports.

Figure 13:
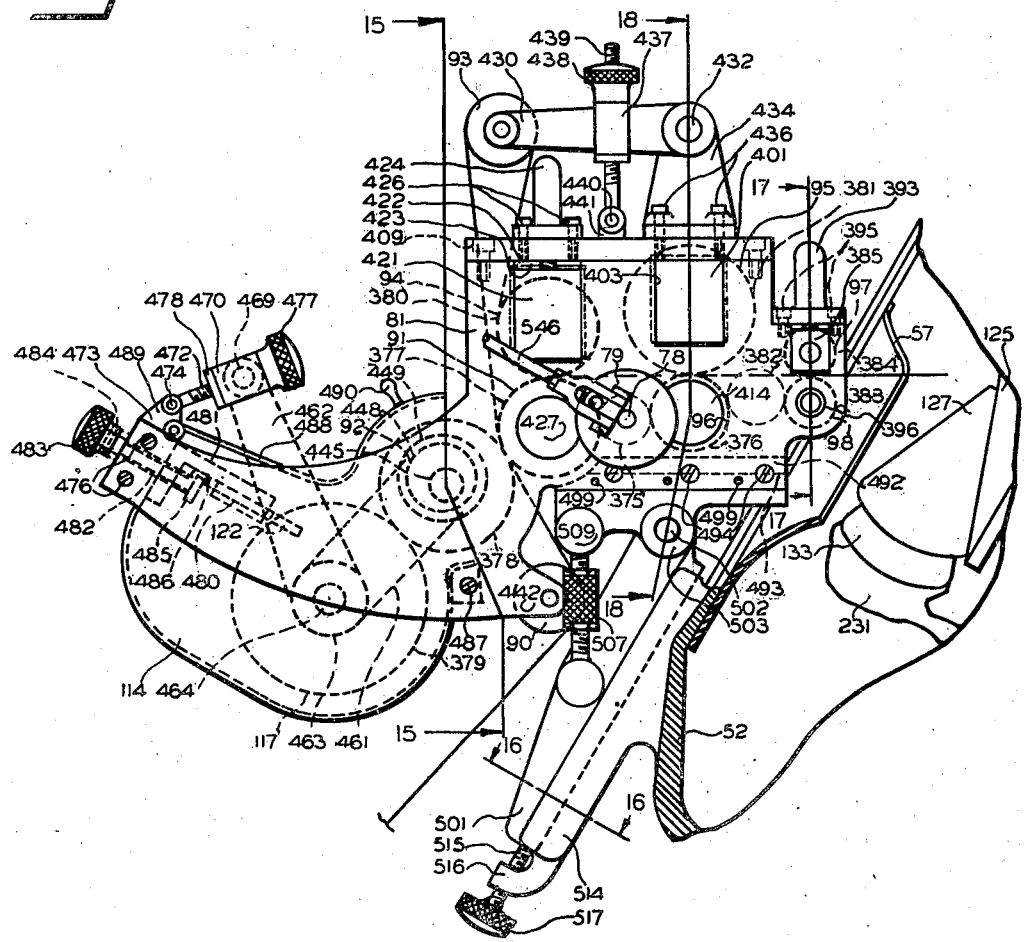
Figs. 13 and 14 are respectively fragmentary side and top elevations of a portion of the machine.

Having described the general arrangement and sequence of operation of the parts of the feeding mechanism with reference to Figs. 3 and 4, the structural details and actual arrangement of the parts will be considered in more detail with particular reference to Figs. 13 to 18 inclusive. Referring particularly to Fig. 13, a gear 375 on the feeder drive shaft 78 meshes with gears 376 and 377 to drive the backing cylinder or anvil roll 96 and the driven roller 91 respectively. The gear 377 meshes with a gear 378 to drive the cement transfer roller 92, and the gear 378 meshes with a gear 379 to drive the cement pickup roller 117. The gear 377 meshes with a gear 380 to drive the driven roller 94. The gear 376 meshes with a gear 381 to drive the cutting cylinder 95. The gear 376 also meshes with an idle gear 382 which, in turn, meshes with a gear 383 to drive the feeding roller 98. The gear 383 also meshes with a gear 384 to drive the cooperating feeding roller 97. In each instance, the dotted lines which represent the gears 375, 376, 377, 378, 379, 380, 381 and 382, indicate the pitch diameters or pitch lines of those gears, which pitch diameters are preferably the same as the diameters of the rollers or cylinders that are driven by the gears, so as to provide the proper surface speed for those driven rollers and cylinders. It will be noted, as previously mentioned, that the pitch diameters of the gears 383 and 384 which drive the feeding rollers 98 and 97 respectively are somewhat smaller than the diameters of the feeding rollers 98 and 97, so that the surface speed of the feeding rollers is somewhat higher than the surface speed of the backing cylinder or anvil roll 96 and the driven rollers 91 and 94.

The feeding roller 97 is rotatably supported in a pair of sleeve bearing blocks 385 and 386, which bearing blocks are preferably cut away as at 387 and 388 respectively and are slidably mounted in recesses 389 and 390 in the side frames 80 and 81. The bearing blocks 385 and 386 are preferably biased toward the feeding roller 98 by compression springs 391 and 392 which are retained within spring caps or housings 393 and 394 respectively. The spring caps or housings 393 and 394 are secured to the side frames 81 and 80 respectively by screws such as 395 or other suitable fastening means. The feeding roller 98 is rotatably supported by bearings 396 and 397 which are mounted in suitable openings in the side frames 81 and 80 respectively. The gears 383 and 384 are drivingly secured to the feeding rollers 98 and 97 respectively by nuts 398 or other suitable means.

The knives 106 are secured to the cutting cylinder by wedge blocks 373 that are secured to the cylinder by screws 374. The cutting cylinder 95 is rotatably supported in anti-friction bearings 399 and 400, which bearings are mounted in blocks 401 and 402 that are respectively mounted in recesses such as 403 in the side frames 81 and 80 respectively. The blocks 401 and 402 preferably have flanges such as 413 and 404 respectively on their inner surfaces and are slidable in the side frames 81 and 80 toward and away from the backing roller or anvil roll 96 to effect proper spacing of the cutting cylinder 95 and knives 106 with respect to the backing cylinder or anvil roll 96. Shims are preferably provided at 405 and 406 between the blocks 401 and 402 and the side frames 81 and 80 respectively; the blocks 401 and 402 preferably being held in position against the shims at 405 and 406 by strips 407 and 408 that are secured to the side frames 81 and 80 respectively by screws such 409 or other suitable fastening means. The block 402 has an opening 410 therein through which an extension 411 on the end of the cutting cylinder 95 extends for supporting the gear 381. A nut 412 threaded onto the end of the extension 411 secures the gear 381 in place and drivingly connects it to the cutting cylinder 95. Bearing caps 414 and 415 which are mounted in suitable openings in the side frames 81 and 80 respectively have anti-friction bearings 416 and 417 mounted therein for rotatably supporting the backing cylinder or anvil roll 96. The gear 376 is mounted on an extension 418 on the end of the backing cylinder or anvil roll 96 and is drivingly secured thereto by a nut 419. The extension 418 extends through an opening 420 in the cap 415.

Bearing blocks such as 421 are slidable toward and away from the roller 91 in recesses such as 422 in the side members 80 and 81. Anti-friction bearings, not shown, are preferably mounted in the bearing blocks such as 421 to rotatably support the roller 94. The bearing blocks such as 421 are biased toward the roller 91 by compression springs such as 423 that are enclosed in spring caps or housings 424 and 425. The spring caps or housings 424 are secured to the strips 407 and 408 respectively by screws such as 426 or other suitable fastening means. The roller 91 is supported by anti-friction bearings, not shown, which are mounted in bearing caps such as 427 that are secured in the side frames 80 and 81.

The idle roller 93 is rotatably supported at the ends of arms 430 and 431, the other ends of which arms are secured to a shaft 432 by pins such as 433 that extend through the arms 430 and 431 and the shaft 432. The shaft 432 is rotatably supported in brackets 434 and 435 that are secured to the strips 407 and 408 by screws 436, so that the arms 430 and 431 are fulcrumed about the axis of the shaft 432. A sleeve 437 is secured to the shaft 432 and the arm 430 intermediate the shaft 432 and the roller 93 and surrounds a channeled portion of a cooperating thumb nut 438 which is threaded onto a stud 439. The stud 439 is fulcrumed at 440 and a bracket 441 is secured to the strip 407. Turning of the thumb nut 438 adjusts the arms 430 and 431 about the fulcrum provided by the shaft 432 to vary the position of the idle roller 93. The idle roller 90 is rotatably supported in projecting portions such as 442 of the side frames 80 and 81.

The cement transfer roller 92 is secured to the end of a shaft 445 by a pin 446 that extends through the shaft 445 and a hub 447 on one side of the cement transfer roller. The shaft 445 is rotatably mounted in an eccentric sleeve bearing 448, which sleeve bearing is rotatably mounted within a support sleeve 449. A knurled thumb nut 450 is threaded onto one end of the eccentric bearing 448 to manually accomplish rotary movement of the bearing within the support sleeve 449. The shaft 445 is drivingly connected to a shaft 451 through a coupling comprising a flange 452 on the end of the shaft 451, a flange 453 on the end of the shaft 445 and an intermediate coupling member 454; the flanges 452 and 453 respectively having channels at 455 substantially disposed at right angles to each other which engage cooperating projections on the coupling member 454. This coupling permits relative movement between the flanges 452 and 453 if the shafts 445 and 451 are slightly out of axial alignment due to adjustments of the cement transfer roller 92. The shaft 451 is rotatably supported by anti-friction bearings 456 and 457 that are mounted in the side frame 80 and has the gear 378 drivingly secured thereto by a nut 458 that is threaded onto the end of the shaft.

The support sleeve 449 is supported by, and preferably integral with, a bell crank 460 which comprises bell crank arms 461 and 462 that are preferably integral with a bearing 463. The bearing 463 is supported by a drive shaft 464 which rotatably supports the cement pick-up roller 117 and is rotatably supported by a bearing in a projecting portion 465 of the side frame 80 and in a bearing supported by a projecting portion 466 on one side of the cement reservoir 114. The bell crank arm 462 has a bearing portion 468 through which a stud 469 extends to fulcrum the arm 462 to a sleeve 470. A nut 471 is threaded onto the stud 469 to hold the sleeve 470 in place. An adjusting screw 472 is fulcrumed to a hinge bracket 473 by a pin 474; the hinge bracket 473 being secured to a frame spacer 475. The frame spacer 475 is in turn secured between the side frames 80 and 81 by screws such as 476. A thumb nut 477 having a flange portion 478 is threaded onto the adjusting screw 472 and rotatably supported in the sleeve 470, so that adjustment of the thumb nut 477 moves the bell crank 460 about the shaft 464. This movement of the bell crank about the shaft 464 changes the position of the cement transfer roller 92 with respect to the roller 91 and the stock to which the cement is applied by the cement transfer roller 92 adjacent the roller 91. This adjustment provides one element of control of the cement that is applied to the stock. The rotation of the eccentric bearing 448 within the sleeve 449 by manual movement of the knurled nut 450 provides another element of control by varying the spacing between the cement transfer roller 92 and the cement pick-up roller 117.

The stripper 122 which removes excess cement from the pick-up roller 117 is slidably mounted in a channel 480 in a stripper support bracket 481 which is secured to the frame spacer 475. A screw 482 having a knurled head 483 secured thereto by a pin 484 is threaded into the frame spacer 475 and extends through the stripper support bracket 481. A flange 485 on the end of the screw 482 engages a recess 486 near the end of the stripper 122, so that manual movement of the knurled head 483 adjusts the stripper 122 toward or away from the cement pick-up roller 117. The cement reservoir 114 is secured to the side frame 81 and the frame spacer 475 by screws such as 487. The cement reservoir has a cover or lid 488 which is hinged at 489, and is provided with a handle 490.

A spacer base 492 having a dove-tail recess 493 therein is secured to and between the side frames 80 and 81 of the feeding mechanism 7 by screws such as 494. The spacer base 492 and side frames 80 and 81 are slidable with respect to a fulcrum base 495 having a dove-tail tongue 496 thereon which is slidable within the dove-tail recess 493. Sliding of the feeding mechanism including the side frames 80 and 81 and the spacer base 492 with respect to the fulcrum base 495 controls the distance of the feeding mechanism 7 and feeding rollers 97 and 98 from the forming mechanism 6. Also, space is preferably provided at 497 and 498 between the gibs 491 and the dove-tail recess 493 to provide for a small and desirable amount of angular movement of the feeding mechanism 7 with respect to the fulcrum base 495. The angular movement of the feeding mchanism 7 with respect to the fulcrum base 495 is accomplished by adjustment of screws such as 499 and 500 which are threaded into the side frames 81 and 80 respectively and the spacer base 492 to engage the gibs 491 which engage the dove-tail tongue 496. The screws such as 499 and 500 also secure the feeding mechanism in the proper position with respect to the fulcrum base 495 and the forming mechanism 6.

The fulcrum base 495 is fulcrumed to a slide 501 by a shaft 502 that extends through projecting portions 503 and 504 on the fulcrum base 495 and is rotatably supported in projecting bearings 505 and 506 that are integral with the slide 501. Struts comprising turn-buckles 507 and 508 are fulcrumed to the fulcrum base 495, as at 509 and to the slide 501 at 510 and 511. Adjustment of the turn buckles 507 and 508 controls the movement of the feeding mechanism 7 about the shaft 502, and the turn-buckles provide braces for supporting the feeding mechanism and securing its position with respect to the slide 501. The slide 501 has dove-tail flanges 512 on each side thereof which are slidably mounted in dove-tail recesses 513 in a main feeder support 514, so that the slide 501 and feeding mechanism 7 are movable with respect to the main support 514 and forming mechanism 6. The main support 514 is preferably integral with the turret housing cover plate 52. The position of the slide 501 with respect to the main support 514 is adjusted and determined by a thumb screw 515 that is threaded into a portion 516 of the main support 514 and has a knurled head 517 for manual adjustment thereof.

Figure 14:
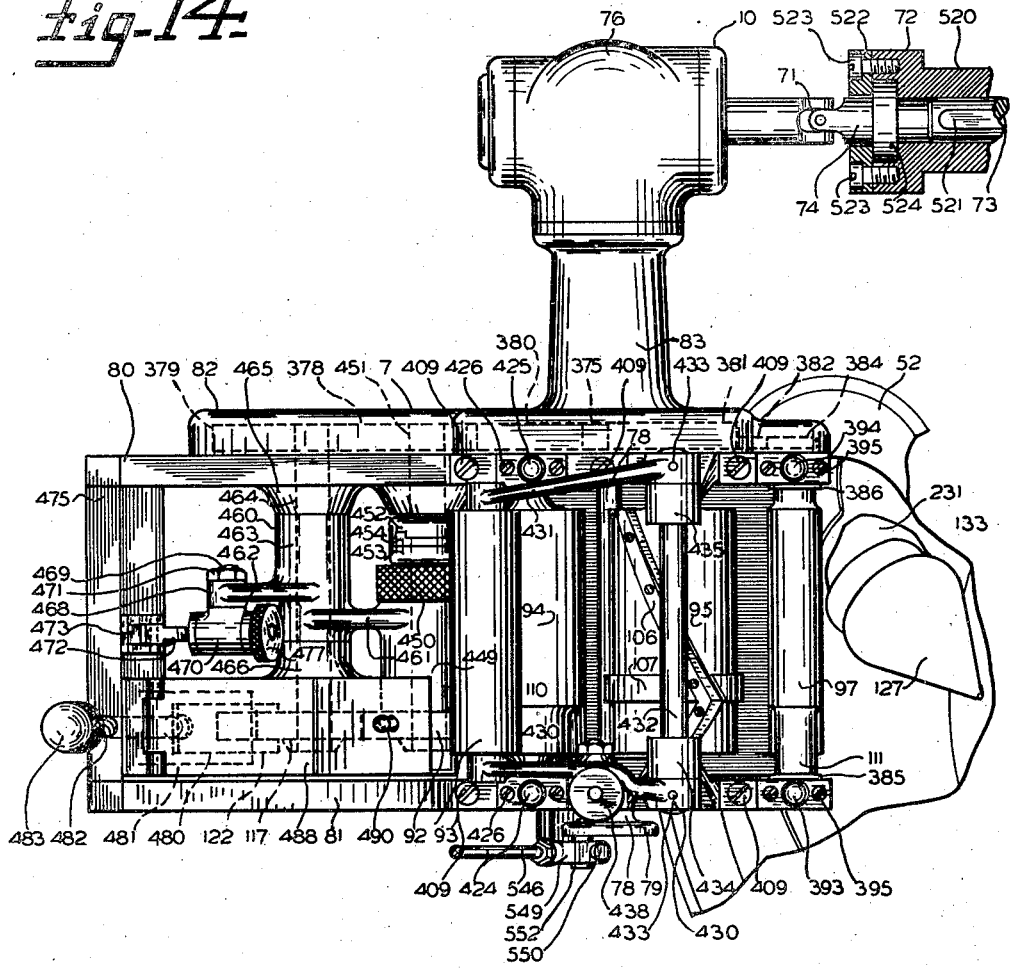
Figure 15:
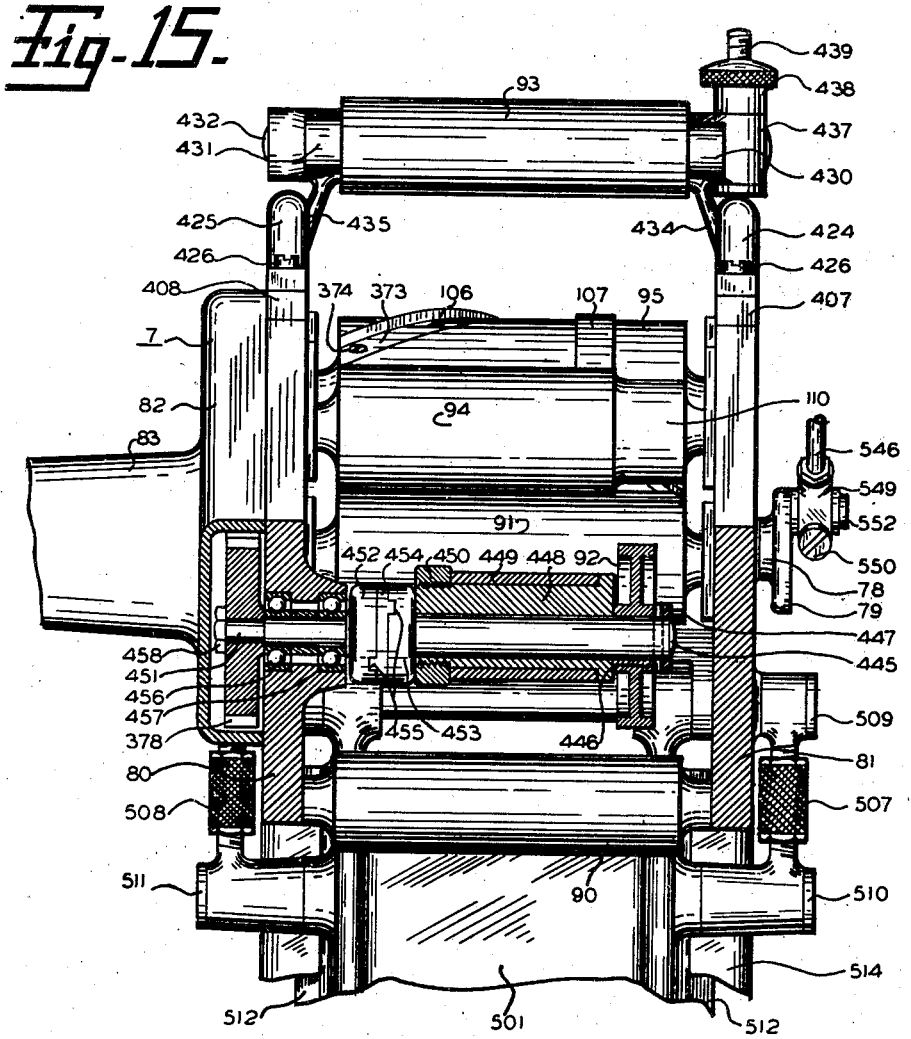
Fig. 15 is a fragmentary sectional view taken substantially on a line 15—15 of Fig. 13 and in the direction of the arrows.
Figure 16:
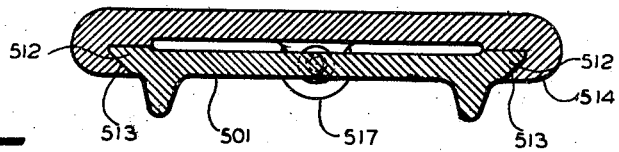
Fig. 16 is a section taken substantially on a line 16—16 of Fig. 13 and in the direction of the arrows.

As illustrated in Fig. 14, the coupling unit 72 comprises a flanged sleeve 520 which is driven by a spline 521 on the shaft portion 73 and a clamping ring 522 which is secured to the flanged sleeve 520 by screws such as 523 to provide a driving connection with a flange 524 on the shaft portion 74. It is also apparent in Fig. 14 that the feeder drive shaft 78 extends across the feeding mechanism 7 to directly drive the disc or flange 79.

Having particular reference to Figs. 19 and 20, the principal structural details of the stacker 8 will be described. The bracket 58 which secures the tubular or cylindrical member 175 to the turret housing cover 52 is preferably secured thereto by screws 530. The formed containers are ejected from the forming cones or mandrels into the tubular or cylindrical member 175 with sufficient force to deform the containers sufficiently to pass the fingers 177 and 178 which extend into the tubular or cylindrical member 175. It is preferable, however, that the containers are pushed into the tubular or cylindrical member 175 and past notched edges 179, so that the containers are held in close juxtaposition in the stacker until the cement has set.

The driven fingers 177 and 178 are preferably integral with a substantially semi-circular member 531 which is supported for longitudinal movement with respect to the tubular or cylindrical member 175 by a slide 532. The slide 532 is slidably mounted in bearings at 533 and 534 which are provided by a base 535 and a cooperating drive housing 536. The drive housing 536 is preferably secured to the base 535 by screws 537. A link 538 is fulcrumed at 539 to a member 540 that is secured to the slide 532. The link 538 is also fulcrumed at 541 to an arm 542 of a bell crank which comprises the arm 542 and an arm 543 fulcrumed on a shaft 544 that is rotatably supported in a projecting portion 545 of the housing 536. A driving link 546 has a bearing 547 secured to one end thereof that engages an angularly projecting shaft portion 548 on the end of the arm 543. A bifurcated member 549 is secured to the other end of the driving link 546 and is fulcrumed by a screw 550 to a bearing block 551 which is disposed between the bifurcated arms and rotatably supported on a bolt 552 that is threaded into the disc or flange 79 near the periphery of the flange or disc. In this mechanism for driving the fingers 177 and 178, the rotation of the disc or flange 79 with the feeder drive shaft 78 effects an oscillatory movement of the bell crank arms 542 and 543 which, in turn, imparts a reciprocating movement to the fingers 177 and 178 to push the containers into the tubular or cylindrical member 175 as they are ejected from the forming mechanism 6. The tubular or cylindrical member 175 is preferably curved near the lower end thereof, as at 554, to facilitate removal of the containers therefrom.

While the form of embodiment of the present invention as herein disclosed constitutes a preferred form, it is to be understood that other forms might be adopted, all coming within the scope of the claims which follow.

What is claimed is as follows:

1. In a machine for producing containers, a forming mechanism comprehending, in combination, a backing cone and a rotary forming cone, the cones being practically tangentially disposed with the apex of the forming cone disposed slightly off radial position from the apex of the backing cone.

2. In a machine for producing containers, a forming mechanism comprehending, in combination, a backing cone and a rotary forming cone adapted to move in a substantially circular path with respect to the backing cone, the cones being practically tangentially disposed with the apex of the forming cone disposed slightly off radial position from the apex of the backing cone, the included angle of the backing cone being so related to the included angle of the forming cone that slippage between the cones is minimized on a line which practically circumferentially bisects the surface area of the forming cone.

3. In a machine for producing containers, a forming mechanism comprehending, in combination, a backing cone and a forming cone, one of said cones having a fixed axis and the other of said cones being rotary and movable about the first mentioned cone in a substantially circular path, the cones being practically tangentially disposed with the apex of one of the cones set slightly off radial position from the apex of the other cone.

4. In a machine for producing containers, a mechanism for forming blanks into containers comprehending a pair of conical members, one of which conical members provides an anvil and the other of which provides a mandrel, one of said conical members being rotary and adapted to move in a substantially circular path with respect to the other; and means for feeding a blank between the conical members each time the conical members reach a predetermined position with respect to each other, said blanks being formed on the mandrel, and each successive blank being fed over said mandrel while the mandrel travels its circular path forming the preceding blank.

5. In a machine for producing containers, a mechanism for forming blanks into containers comprehending a pair of conical members, one of which conical members provides an anvil and the other of which provides a mandrel, one of said conical members being rotary and adapted to move in a substantially circular path with respect to the other; means for feeding the blanks between the conical members each time the conical members reach a predetermined position with respect to each other, said blanks being formed on the mandrel; and means for trimming an edge of the blanks as said blanks are formed on the mandrel, the last mentioned means comprising a circular cutter traveling with the rotary member and cooperating with a surface of the mandrel to provide a shear.

6. In a machine for producing containers, a mechanism for forming blanks into containers comprehending a pair of conical members, one of which conical members provides an anvil and the other of which provides a mandrel, one of said conical members being rotary and supported for movement in a substantially circular path with respect to the other; and means for feeding a stock strip toward said conical members, cutting means to sever blanks from said strip, feeding means to successively deliver blanks between the conical members each time the conical members reach a predetermined position with respect to each other, said blanks being formed on the mandrel, the last mentioned means comprising a pair of driven feed rollers, said mandrel and feed rollers being so disposed with respect to each other that the blanks are picked up between the conical members before being released by the feed rollers.

7. In a machine for producing containers, a mechanism for forming blanks into containers comprehending a pair of conical members, one of which conical members provides an anvil and the other of which provides a mandrel, one of said conical members being rotary and supported for movement in a substantially circular path with respect to the other; means for feeding the blanks between the conical members each time the conical members reach a predetermined position with respect to each other, said blanks being formed on the mandrel; and a pair of locating instrumentalities associated with the anvil for insuring proper register of the leading edge of the blank with respect to the conical members.

8. In a machine for producing containers, a mechanism for forming blanks into containers comprehending a stationary substantially conical anvil and a plurality of substantially conical and equiangularly displaced mandrels upon which the blanks are successively formed into containers, said mandrels being rotatably supported and movable in a substantially circular path about the conical face of the anvil, and feeding means to deliver each succeeding blank over a mandrel acting upon a preceding blank in position to be picked up by the following mandrel.

9. In a machine for producing containers, a mechanism for forming blanks into containers comprehending a stationary substantially conical anvil and a plurality of substantially conical and equiangularly displaced mandrels upon which the blanks are successively formed into containers, said mandrels being rotatably supported and movable in a substantially circular path about the conical face of the anvil; and a blank feeding mechanism disposed to project the blanks over one mandrel and between a succeeding mandrel and the anvil.

10. In a machine for producing containers, a mechanism for forming blanks into containers comprehending a stationary substantially conical anvil and a plurality of substantially conical and equiangularly displaced mandrels upon which the blanks are successively formed into containers, said mandrels being rotatably supported and movable in a substantially circular path about the conical face of the anvil; and a pair of driven blank feeding rollers so positioned with respect to the mandrels and anvil that each blank is fed between the anvil and one mandrel before being released by the feeding rollers and each blank is released by the feeding rollers in time to pass from the path of the leading edge of the succeeding blank.

11. In a machine for making conical paper cups, a disk-shaped backing member having a relatively large outer face, a conical mandrel in cooperative relationship with said face, said mandrel being movable relatively to said face in such position that an element of the mandrel tends to contact the face, means to rotate the mandrel about its axis, means to carry the mandrel through an orbit over said face, and separating means arranged to periodically separate the mandrel and backing member to permit ejection of a formed cup from the mandrel.

12. In a machine for making conical paper containers, a stationary shaft, a rotatable turret head on said shaft and movable relatively thereto, a plurality of spaced conical mandrels carried by said turret head, each mandrel being rotatable about its own axis while being carried in an orbital path by said turret head, and a backing member fixedly mounted on said shaft and arranged to cooperate simultaneously with all said mandrels during their orbital travel.

13. In a machine for making conical paper containers, a stationary backing member having a smooth surface, a conical mandrel rotatable about its own axis with an element of the mandrel cooperating with the backing member to wind a blank about the mandrel against the backing member, and means to translate the mandrel through an orbital path around the backing member, the axis of the mandrel being slightly offset from the axis of the backing member to create a slight slippage therebetween and insure a tightly closed apex on the finished container.

14. In a conical container making machine, forming means, feeding means arranged to deliver a substantially continuous strip of stock toward said forming means, cutting means to sever blanks successively from the stock strip, a segmented glue pick-up roller, and a segmented glue applying roller to take glue from the pick-up roller and apply it in spaced patches to the stock strip, one of said rollers having a different number of segments than the other to vary the cooperating segments in successive revolutions of the rollers.

15. A device of the class described comprising a forming head arranged to gyrate around a central axis, a conical backing member concentric with said central axis and having an apex coincident therewith, a forming element on said forming head extending toward said central axis and having a conical surface engaging said backing member, said forming element being arranged to receive and fold a sheet-like blank during gyration of said forming head, means to feed blanks successively to said forming element and at an angle relative to the surface of said backing member, and means to gyrate said forming head.

16. In a container-forming device of the class described the combination of forming means arranged to gyrate continuously around a central axis, a backing member concentric on said central axis and arranged to coact with said forming means to receive and fold a container blank during gyration of said forming means, means to feed container blanks to said forming means along and in a plane intersecting the surface of said backing member and means to actuate said forming means and said feeding means.

17. In a device of the class described the combination of a plurality of forming heads arranged to gyrate continuously around a central axis, a cone-shaped backing member concentric with said central axis and having an apex coincident therewith, a conical forming element on each of said forming heads arranged to coact with said backing member to receive and fold sheet-like container blanks during gyration of said forming heads, means to feed container blanks to said forming elements successively in a plane intersecting the apex of said backing member and forming an angle with the surface thereof, and means to gyrate said forming heads and actuate said feeding means synchronously.

18. A device of the class described comprising a forming head arranged to gyrate around a central axis, a conical forming element on said forming head extending toward said central axis and arranged to receive and fold a sheet-like blank during gyration of said forming head, said forming element having its base end margin normal to its axis, an eccentrically positioned cutter overlapping said base margin and carried by said forming head, means to feed blanks successively toward said central axis for engagement with said forming element, and means to gyrate said forming head.

19. A device of the class described comprising a forming head arranged to gyrate around a central axis, a conical forming element on said forming head extending toward said central axis and arranged to receive and fold a sheet-like blank during gyration of said forming head, said forming element having its base end margin normal to its axis, a rotatable cutter journalled in said forming head eccentrically relative to the axis of said forming element and overlapping said base margin, means to feed blanks continuously and uninterruptedly to said forming element, means to gyrate said forming head and actuate said feeding means synchronously, and means to rotate said cutter during gyrations of said forming head.

20. A device of the class described comprising a forming head arranged to gyrate around a central axis, a conical backing member concentric with said central axis and having an apex coincident therewith, a forming element on said forming head extending toward said central axis and having a conical surface engaging said backing member, said forming element being arranged to receive and fold a sheet-like blank in cooperation with said backing member during gyration of said forming head, means to feed blanks successively to said backing member and forming element so that the blanks first engage said mandrel adjacent its apex, and means to gyrate said forming head and actuate said feeding means.

21. In a device of the class described the combination of a forming head arranged to gyrate around a central axis, a fixed annular backing member concentric with said central axis, an annular rotatable forming element carried by said forming head with its axis directed toward said central axis, said forming element and backing member being arranged to cooperatively receive and fold a sheet-like container blank during gyration of said forming head, means to feed blanks successively and uninterruptedly to said forming element and backing member in a plane angularly located with respect to the surface of said backing member, and means to gyrate said forming head, rotate said forming element, and actuate said feeding means synchronously.

22. In a device of the class described the combination of a plurality of forming heads arranged to gyrate continuously around a central axis, a cone-shaped backing member concentric with said central axis and having an apex coincident therewith, a conical forming element on each of said forming heads arranged to coact with said backing member to receive and fold sheet-like container blanks during gyration of said forming heads, means to feed container blanks uninterruptedly to said backing member in a plane intersecting said apex and at an angle relative to the surface of said backing member, and means to gyrate said forming heads.

23. A device of the class described comprising a forming head arranged to gyrate continuously around a central axis, a conical backing member concentric with said central axis and having an apex coincident therewith, a conical forming element on said forming head extending toward said central axis, and engaging said backing member, said forming element being arranged to receive and fold a sheet-like blank in cooperation with said backing member during gyration of said forming head, means to feed blanks successively to said backing member and forming element in a plane intersecting the apex of said backing member and forming an angle with the surface thereof, means to lift said forming element away from said backing member when the folding operation is completed, means to discharge the folded article from said forming element automatically while the same is in lifted position, and means to gyrate said forming head and actuate said feeding means.

24. In a device of the class described the combination of a forming head arranged to gyrate around a central axis, a fixed annular backing member concentric with said central axis, an annular rotatable forming element carried by said forming head with its axis directed toward said central axis, said forming element and backing member being arranged to cooperatively receive and fold a sheet-like container blank during gyration of said forming head, means to feed blanks successively and uninterruptedly to said forming element and backing member in a plane angularly located with respect to and intersecting the surface of said backing member, and means to gyrate said forming head continuously, rotate said forming element continuously, and actuate said feeding means, all synchronously.

25. In a container forming device of the class described, forming means arranged to gyrate continuously around a central axis and mounted for pivotal movement on an axis normal thereto, a backing member concentric on said central axis and arranged to coact with said forming means to receive and fold a container blank during gyration of said forming means, means to feed container blanks to said forming means, a cam positioned at a predetermined point adjacent the path of said forming means, means on said forming means arranged to engage said cam to shift said forming means pivotally away from said backing member momentarily when the container forming operation is completed, means to discharge the formed container from said forming means while the same is in shifted position, and means to actuate said forming means and said feeding means.

26. In a container forming device of the class described, forming means arranged to gyrate continuously around a central axis and mounted for pivotal movement on an axis normal thereto, a backing member concentric on said central axis and arranged to coact with said forming means to receive and fold a container blank during gyration of said forming means, an annular cam ring concentric with said central axis and adjacent the path of said gyrating forming means, means on said forming means arranged to engage said cam ring continuously, said cam ring having a projection at a predetermined location to shift said forming means pivotally away from said backing member momentarily when the container forming operation is completed, means to discharge the formed container from said forming means while the same is in shifted position, and means to gyrate said forming means and actuate said feeding means.

27. A device of the class described comprising a conical backing member having an apex, a forming head arranged to gyrate continuously around the axis of said backing member, a conical forming element journalled in said forming head and arranged to rotatably engage the surface of said backing member, said forming element having the margin of its base end control to its axis, a cutting wheel overlapping the base end of said forming element and journalled on an axis in said head parallel with and offset from the axis on said forming element, means to gyrate said forming head, and means to rotate said forming element and cutter during gyration of said forming head.

28. A device of the class described comprising a conical backing member having an apex, a forming head arranged to gyrate continuously around the axis of said backing member, a conical forming element journalled in said forming head and arranged to rotatably engage the surface of said backing member, said forming element having the margin of its base end normal to its axis, a cutting wheel overlapping the base end of said forming element and journalled on an axis in said head parallel with and offset from the axis of said forming element, means to gyrate said forming head, and means to rotate said forming element and cutter in the opposite directions during gyration of said forming head.

29. In a machine of the character described, a conical former having a substantially pointed apex, a smooth immobile surface in cooperative relationship with said former, feeding means to continuously advance a stock strip toward said former, cutting means in advance of the former to sever blanks from the continuously moving stock strip, means to advance successive blanks to said immobile surface in position to be picked up by said former, and actuating means to both rotate said former about its axis and simultaneously swing it bodily through an orbital path over said surface to wind a blank into a conical cup.

30. In a machine for making conical paper cups, a vertically disposed disk-like backing member, a conical mandrel rotatable about its own axis and bodily movable through an orbital path over said backing member, feeding means arranged to continuously advance a stock strip toward said backing member, continuously moving cutting means arranged to successively sever blanks from said strip, and feeding means to advance successive blanks at an angle to said backing member to be picked up by said mandrel and wound into a cup.

31. In a machine for making conical paper cups, a stationary disk-like backing member, a plurality of spaced conical mandrels each rotatable about its axis, means carrying said mandrels bodily and in unison through an orbital path over said backing member, feeding means arranged to advance a stock strip toward said backing member, cutting means arranged to successively sever blanks from said strip and blank feeding means arranged to successively and uninterruptedly advance blanks at an angle to said backing member to be picked up by a mandrel, each oncoming blank passing over a mandrel winding a preceding blank.

32. In a machine for making conical paper cups, a stationary backing member, movable supporting means, a plurality of forming mandrels carried by said supporting means through an orbital path over said backing member and each mandrel being rotatable about its own axis, means for driving said supporting means at a high rate of speed to rapidly whirl said mandrels through their orbital path, and feeding means arranged to successively advance blanks to said backing member in position to be picked up by a mandrel with each blank being delivered to pick-up position over a mandrel operating on a previously delivered blank.

33. In a machine for making conical paper cups, a stationary backing member, movable supporting means, a plurality of forming mandrels carried by said supporting means through an orbital path over said backing member and each mandrel being rotatable about its own axis, means for driving said supporting means at a high rate of speed to rapidly whirl said mandrels through their orbital path, feeding means arranged to advance a strip of stock toward said backing member, cutting means arranged to successively strike blanks from said stock strip, and feeding means to advance the blanks to said backing member in position to be picked up by a mandrel with each oncoming blank passing over a mandrel acting on a previously delivered blank.

34. In a machine for making conical paper cups, a stationary backing member, translatable supporting means, a plurality of rotatable forming mandrels carried by said supporting means through an orbital path over said backing member, means for driving said supporting means and rotating said mandrels continuously, feeding means arranged to continuously advance a stock strip toward said backing member, rotary cutting means continuously operating to successively strike blanks from said stock strip, and blank feeding means arranged to successively and uninterruptedly advance blanks to said backing member in position to be picked up by a mandrel, each mandrel engaging a blank and winding it beneath an oncoming blank as the mandrel continuously travels its orbital path.

35. In a machine for making single-piece conical paper cups, a stationary conical backing member, translatable supporting means, a plurality of conical forming mandrels carried by said supporting means through an orbital path over said backing member in substantially element to element contact with said backing member, each of said mandrels being also rotatable about its own axis, means associated with each mandrel to engage a blank to be formed, driving means to translate said supporting means and cause rotation of said mandrels, feeding means arranged to continuously advance a stock strip toward said backing member, adhesive applying means arranged to place spaced patches of glue on the stock strip, rotary cutting means arranged to successively sever blanks from the traveling strip, said cutting means severing the strip between adjacent patches of adhesive in a manner to define an adhesived blank, blank feeding means arranged to successively and uninterruptedly advance blanks to said backing member in position to be picked up by a mandrel traveling its orbital path toward the leading edge of the blank, each blank being fed over a mandrel acting upon a previously fed blank, means arranged to establish a temporary separation between each mandrel and said backing member in a location following the winding of a blank on a mandrel, and discharging means acting during such temporary separation to remove a wound blank from a mandrel.

36. The method of forming a single-piece conical paper cup the height of which is not more than approximately twice the diameter of the open mouth thereof, including the steps of continuously feeding a stock strip toward a forming station, applying adhesive to said strip, successively severing blanks from the continuously moving strip at a point in advance of the forming station, successively and uninterruptedly feeding the blanks to a position at said forming station to be engaged by a conical mandrel, and moving the mandrel bodily over a relatively fixed surface to wind the blank into a cup.

37. The method of forming single-piece conical paper drinking cups the height of which cups is not more than approximately twice the diameter of the mouth thereof, including the steps of rapidly and uninterruptedly feeding adhesived blanks which are successively severed from a continuously moving stock strip at a point in advance of a forming station to the forming station between a conical former and an immobile surface, and rolling the former around said immobile surface to wind a blank into a conical cup in time to pick up an oncoming blank and repeat the operation.

38. The method of making conical paper cups with the aid of a smooth immobile surface and a plurality of rotatable forming mandrels arranged to bodily travel through an orbital path over said surface, including the steps of successively and uninterruptedly feeding blanks to said surface in position to be picked up by a mandrel, said feeding being at an angle to said surface and each blank being fed over a mandrel acting upon a previously fed blank.

39. In a conical paper cup making machine in which one-piece blanks are successively and continuously cut from a continuously advancing stock strip and fed uninterruptedly along a predetermined path to a location to be picked up by forming means, each blank having a leading edge of proper configuration for engagement by forming means, rapidly and continuously rotating supporting means, and a plurality of conical mandrels carried by said supporting means, said means rotating in a plane substantially transverse to said path of blank feed, and each said mandrel being arranged with an element substantially paralleling the major part of the leading edge of the forwardmost blank and to intersect that edge portion in the travel of the mandrel, the leading blank being picked up by the mandrel and carried away out of the path along which blanks are fed.

40. In a conical paper cup making machine, forming means for winding a single-piece blank into conical cup shape, feeding means arranged to continuously advance a stock strip toward the general location of said forming means, and unitary cutting means in advance of said forming means arranged to successively sever blanks from the continuously moving strip and advance such blanks in a constant procession toward said forming means, said cutting means including a roller type cutter continuously rotating at a speed consistent with the forward advance of the paper strip and carrying a curvate knife edge of a character to cut a blank with the leading edge of the blank shaped and positioned for registry with said forming means.

41. In a conical paper cup making machine, movable supporting means, a plurality of substantially conical mandrels carried by said supporting means through an orbital path and around each of which a single-piece blank may be shaped into a conical cup, feeding means arranged to continuously advance a stock strip toward a part of the path of said mandrels, and rotary cutting means continuously operating to successively sever single-piece conical paper cup blanks from said stock strip and advance the blanks uninterruptedly in a constant procession toward a position of engagement with one of said mandrels.

42. In a conical paper cup making machine, a plurality of substantially conical forming mandrels arranged to travel bodily through an orbital path and successively reach a blank pick-up position, feeding means arranged to continuously advance a stock strip toward said pick-up position, and rotary cutting means carrying a curvate cutting edge arranged to continuously rotate and successively sever blanks from the advancing stock strip and uninterruptedly advance the blanks toward said pick-up position in time for each blank to be engaged by a different mandrel than the preceding blank.

43. In a conical paper cup making machine, a plurality of substantially conical forming mandrels arranged to travel bodily through an orbital path and successively reach a blank pick-up position, feeding means arranged to continuously advance a stock strip toward said pick-up position, and a cylindrical cutter carrying a curvate cutting edge so disposed on said cutter as to sever a blank from said stock strip with the leading edge of the blank of proper shape and disposition to register with a forming mandrel at said pick-up position with a portion of the blank going to form the apexial region of the resultant cup extending beyond the tip of the mandrel, said cutter rotating continuously at a speed consistent with the advance of said strip to successively sever blanks from said strip and uninterruptedly advance the blanks in procession toward said pick-up position.

44. In a conical paper cup making machine, a plurality of substantially conical forming mandrels arranged to travel bodily through an orbital path and successively reach a blank pick-up position, feeding means arranged to continuously advance a stock strip toward said pick-up position, and rotary cutting means carrying a curvate cutting edge arranged to continuously rotate and successively sever single-piece conical paper cup blanks from the advancing stock strip and uninterruptedly advance the blanks toward said pick-up position, and blank feeding means disposed between said cutting means and said blank pick-up position and arranged to advance blanks in uninterrupted succession to said pick-up position with each blank in the same angular position relative to its line of travel as when severed by the cutting means, and said blank feeding means being arranged so at least a portion thereof engages a blank before that blank is free from said cutting means.

45. In a conical paper cup making machine, a plurality of substantially conical mandrels around each of which a single-piece blank may be shaped into a conical cup, movable supporting means arranged to carry said mandrels bodily through an orbital path, feeding means arranged to continuously advance a stock strip toward a part of the path of said mandrels, a unitary rotary cutter continuously rotating at a speed consistent with the forward advance of the paper strip and carrying a curvate knife edge of a character to successively cut blanks from the stock strip with the leading edge of a blank shaped and positioned for registry with a mandrel, and a relatively fixed surface over which said mandrels are moved by said supporting means after picking up a blank.

46. In a conical paper cup making machine, movable supporting means, a plurality of substantially conical mandrels around each of which a single-piece paper blank may be shaped into a complete conical paper cup, said mandrels being bodily moved through an orbital path by said supporting means, feeding means arranged to continuously advance a stock strip towards a part of the orbital path of said mandrels, gluing means arranged to apply glue to the traveling strip in spaced areas, a unitary rotary cutting element continuously operable to successively sever single-piece paper cup blanks from the continuously moving stock strip, a curvate cutting edge on said cutting element for severing the strip between adjacent areas of glue so as to leave an amount of glue on each blank without the cutting edge contacting the glue, other feeding means acting on the paper stock during the severance of a blank to insure an uninterrupted advance of blanks to said mandrel path where each blank may be engaged and carried along by a mandrel, and a relatively fixed surface over which each mandrel travels during the forming of a blank therearound into a cup.

CLARENCE T. BREWER.